US006324149B1

(12) United States Patent
Mifune et al.

(10) Patent No.: US 6,324,149 B1
(45) Date of Patent: Nov. 27, 2001

(54) OPTICAL-PICK-UP DEVICE ACHIEVING ACCURATE POSITIONING OF OBJECTIVE LENS AND SOLID-IMMERSION LENS AND METHOD OF FORMING SAME

(75) Inventors: Hironobu Mifune; Kouichi Ohtaka, both of Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/083,960

(22) Filed: May 26, 1998

(30) Foreign Application Priority Data

May 27, 1997 (JP) .................................................. 9-137289
Oct. 7, 1997 (JP) .................................................. 9-274823

(51) Int. Cl.[7] .................................................. G11B 7/00
(52) U.S. Cl. .................................. 369/112.01; 369/44.23; 369/112.23
(58) Field of Search ........................ 369/112.01, 126, 369/44.23, 112.23; 359/719, 708

(56) References Cited

U.S. PATENT DOCUMENTS

| 5,035,486 | * | 7/1991 | Inokuchi | 350/167 |
| 5,125,750 | | 6/1992 | Corle et al. | 359/819 |
| 5,148,322 | * | 9/1992 | Aoyama et al. | 359/708 |
| 5,373,519 | * | 12/1994 | Siono et al. | 359/572 |
| 5,497,359 | | 3/1996 | Mamin et al. | 369/112 |
| 5,731,899 | * | 3/1998 | Meyers | 359/621 |
| 5,754,514 | * | 5/1998 | Guerra | 369/116 |
| 5,759,457 | * | 6/1998 | Inoue et al. | 264/2.5 |
| 5,910,940 | * | 6/1999 | Guerra | 369/275.1 |
| 5,936,928 | * | 8/1999 | Jain et al. | 369/112 |
| 5,978,139 | * | 11/1999 | Hatakoshi et al. | 369/44.23 |
| 6,044,056 | * | 3/2000 | Wilde et al. | 369/119 |

FOREIGN PATENT DOCUMENTS

| 5-173003 | 7/1993 | (JP) . |
| 6-194502 | 7/1994 | (JP) . |
| 6-208006 | 7/1994 | (JP) . |
| 6-300902 | 10/1994 | (JP) . |
| 7-181303 | 7/1995 | (JP) . |
| 7-198906 | 8/1995 | (JP) . |
| 7-244206 | 9/1995 | (JP) . |
| 7-281007 | 10/1995 | (JP) . |
| 8-171003 | 7/1996 | (JP) . |
| 8-179299 | 7/1996 | (JP) . |
| 8-212579 | 8/1996 | (JP) . |
| 8-221772 | 8/1996 | (JP) . |
| 8-221790 | 8/1996 | (JP) . |

OTHER PUBLICATIONS

B. D. Terris, et al., Appl. Phys. Lett., vol. 68, No. 2, pp. 141–143, Jan. 8, 1996, "Near–Field Optical Data Storage".

* cited by examiner

Primary Examiner—David Hudspeth
Assistant Examiner—Kim-Kwok Chu
(74) Attorney, Agent, or Firm—Oblon, Spivak, McClelland, Maier & Neustadt, P.C.

(57) ABSTRACT

An optical-pick-up device focuses a coherent light beam to form a spot on an optical recording medium, and performs recording/reproducing of information with respect to the optical recording medium. The optical-pick-up device includes a substrate and an objective lens which is provided on one side of the substrate and focuses the coherent light beam at an exposed surface situated on another side of the substrate.

27 Claims, 27 Drawing Sheets

RECORD SURFACE

SUBSTRATE WITH OBJECTIVE LENS

SUBSTRATE WITH
SOLID-IMMERSION LENS

OPTICAL-PICK-UP DEVICE ACHIEVING ACCURATE POSITIONING OF OBJECTIVE LENS AND SOLID-IMMERSION LENS AND METHOD OF FORMING SAME

BACKGROUND OF THE INVENTION

1. Field of the Invention

The present invention generally relates to an optical-pick-up device used for recording information on an optical memory and reproducing information from the optical memory, and particularly relates to a method of manufacturing the optical-pick-up device wherein an objective lens and a solid-immersion lens (hemisphere-shaped lens) are formed in a substrate by using a semiconductor manufacturing process. The device may be formed as a single integrated composite, or may be formed separately and connected together. The present invention also relates to an optical-pick-up assembly.

2. Description of the Related Art

FIG. 1 is an illustrative drawing showing a related-art optical-pick-up assembly used for an optical memory. In the figure, the optical-pick-up assembly includes a laser diode 1, a collimator lens 2, a polarized-light-beam splitter 3, a quarter-wave plate 4, an objective lens 5, an optical disc 6, a photodiode 7, and a convergence lens 8. The laser diode 1 emits a coherent laser beam having a predetermined wavelength. The collimator lens 2 applies optical correction to the laser beam so as to create a parallel beam. The objective lens 5 focuses the laser beam on a recording surface of the optical disc 6. The optical disc 6 has the recording surface on one side thereof facing the objective lens 5. The optical-pick-up assembly further includes other optical components for focus detection, track detection, etc., which are omitted from the figure for the sake of clarity.

In the configuration described above, the laser diode 1 emits the laser beam having a linear polarization, a direction of which is parallel to a surface of the sheet of paper bearing the figure. The laser beam is then optically corrected by the collimator lens 2 to become a parallel beam. The parallel laser beam passes through an optical isolator comprised of the polarized-light-beam splitter 3 and the quarter-wave plate 4. The passage of the laser beam through the optical isolator changes the linear polarization of the beam into a circular polarization. When being reflected by the recording surface of the optical disc 6, the laser beam changes a direction of the vibration, and becomes perpendicular to the surface of the sheet of paper after passing through the quarter-wave plate 4. The laser beam is then reflected by the polarized-light-beam splitter 3 to travel toward the photodiode 7, and is focused by the convergence lens 8 on the photodiode 7.

This configuration has limitations in that a size of the laser spot can only be as small as the wavelength of the laser light because a limit is imposed by optical diffraction. A size W of the laser spot is represented as:

$$W = \text{proportional to } L/\sin \phi \qquad (1)$$

wherein $\phi$ is an angle of a beam coming out from the objective lens. An NA (numerical aperture) of the lens is related to $\sin \phi$ by the equation $NA = \sin \phi$. Further, L represents a wavelength of the light.

Because of the above-mentioned limitations, a hemisphere-shaped lens (solid-immersion lens) is arranged between the objective lens and the memory media, as is analogous to a liquid-immersion method in a microscopy, thereby stepping up an effective value of NA. This scheme is proposed by Kino with Stanford University. As shown in FIG. 2A, a solid-immersion lens 10a is positioned so close to the recording surface that a gap therebetween is smaller than the wavelength of the light. This configuration can draw on the fact that a spot size of the beam focused on the bottom surface of the lens is reciprocal to the refractive index of the lens.

With a refractive index n of the lens, the spot size is represented as:

$$W = \text{proportional to } L/(n \sin \phi) \qquad (2)$$

If the solid-immersion lens is more than half a sphere as shown as 10b in FIG. 2B, Snell's law is observed on the surface of the solid-immersion lens 10b, so that the spot size further becomes smaller. In this case, the spot size is represented as:

$$W = \text{proportional to } L/(n^2 \sin \phi) \qquad (3)$$

If the lens is formed so as to have a thickness of $r(1+1/n)$ (r: radius, n: refractive index), aberration can be suppressed to a relatively small level.

In the above configurations, the gap between the solid-immersion lens and the recording surface should be smaller than the wavelength of light, and should be as small as around 100 nm. To satisfy this requirement, an airborne head has been proposed based on aerodynamics (B. D. Terris, H. H. Mamin, and D. Rugar, "Near field optical data storage," Appl. Phys. Lett., 68, No.2, 141, 1996; U.S. Pat. No. 5,497,359).

FIG. 3 is an illustrative drawing showing such an airborne head.

The head of FIG. 3 has a solid-immersion lens 10c (refractive index=1.83) glued on an upper surface of a slider, and an objective lens 5 (NA=0.5) is positioned over the solid-immersion lens 10c at an appropriate distance. This configuration achieves a spot size of 360 nm when light having a wavelength of 830 nm is used.

Other documents disclosing use of a solid-immersion lens include the following. Japanese Laid-open Patent Application No.8-212579 discloses correcting spherical aberration when it is caused by a variation in the thickness of a lens or the thickness of a recording medium. Japanese Laid-open Patent Application No.8-221772 discloses a configuration for suppressing spherical aberration, and Japanese Laid-open Patent Application No.8-221790 discloses a configuration for suppressing coma aberration. In these documents, an airborne scheme is not used, and the solid-immersion lens and the objective lens are controlled by separate actuators.

With regard to manufacture of micro-lenses, the following documents may be referred to. Japanese Laid-open Patent Application No.6-194502 discloses a structure of a convex micro-lens and a method of manufacturing the same. Japanese Laid-open Patent Application No.6-208006 discloses an array of convex micro-lenses having a long focus distance. Japanese Laid-open Patent Application No.7-181303 teaches a method of manufacturing a micro-lens array in which each micro-lens has a convex surface on either side thereof. Japanese Laid-open Patent Application No.7-198906 discloses materials and devices used for micro-lenses of various shapes having a convex surface on either side thereof, and teaches a method of manufacturing such micro-lenses. Japanese Laid-open Patent Application No.7-244206 discloses a method of manufacturing a concave micro-lens.

For information about forming a curved surface by etching, the following documents may be referred to. Japanese Laid-open Patent Application No.5-173003 discloses applying dry-etching after forming a convex/concave curved surface on photoresist by use of scattered light or a diffuser. This document does not disclose making of a flat surface. Japanese Laid-open Patent Applications No.6-30090, No.7-281007, No.8-171003, and No.8-179299 disclose forming a concave surface by applying wet etching to a substrate, and pouring material having a high refractive index in order to create a flat-surface micro-lens for use in a liquid-crystal display.

Use of techniques disclosed in the above-identified documents does not help the configuration of FIG. 3 when this configuration fails to achieve a desired spot size. Such a failure is caused by a displacement of relative positions between an objective lens and a solid-immersion lens, and is exacerbated by a large NA of a combined lens comprised of the objective lens and the solid-immersion lens.

In other words, a desired spot size cannot be insured since it is difficult to maintain an accurate gap between the objective lens and the solid-immersion lens. This leads to a failure in achieving high-density recording/reproduction of information.

Further, some micro-lenses have a convex lens shape (i.e., a convex external surface). Such a shape prevents optical devices such as other types of lenses and light emitting/detecting devices from being overlaid even when there is a need to do so. This is because a substrate in this case does not have a flat surface that would make it easier to implement an overlaid structure.

Other micro-lenses have a flat external surface and are ensconced in a concave-surface recess formed in a substrate after such a recess is created by wet etching, or are implemented as a refractive-index distribution inside a substrate. It is difficult, however, to implement various structures within a single substrate because a manufacturing process becomes prohibitively complex, or because difficulties are encountered in creating a lens of a desired shape at an accurate position in either side of the substrate.

Accordingly, there is a need for an optical-pick-up device which insures a beam spot of a small size by maintaining accurate positioning of an objective lens and a solid-immersion lens, thereby achieving high-density writing and reading of information.

Further, there is a need for a method of manufacturing an optical-pick-up device which allows lenses to be readily created in a flat-surface substrate, and makes it possible to overlay other optical devices.

SUMMARY OF THE INVENTION

Accordingly, it is a general object of the present invention to provide an optical-pick-up device and a method of creating the same which can satisfy the needs described above.

It is another and more specific object of the present invention to provide an optical-pick-up device which insures a beam spot of a small size by maintaining accurate positioning of an objective lens and a solid-immersion lens, thereby achieving high-density writing and reading of information.

It is yet another object of the present invention to provide a method of creating an optical-pick-up device which allows lenses to be readily created in a flat-surface substrate, and makes it possible to overlay other optical devices.

According to the present invention, an optical-pick-up device which focuses a coherent light beam to form a spot on an optical recording medium, and performs recording/reproducing of information with respect to the optical recording medium includes a substrate and an objective lens which is provided on one side of the substrate and focuses the coherent light beam at an exposed surface situated on another side of the substrate.

In the optical-pick-up device described above, the objective lens is formed as an integral part of the substrate, and focuses light at an exposed surface of the substrate. In other words, a thickness of the substrate is equal to the focal distance of the objective lens. Since the light is focused inside the substrate material, a size of the focused spot can be made smaller than it otherwise would be, thereby achieving a high-density recording/reproducing of information.

According to one aspect of the present invention, a layer having a refractive index higher than that of the substrate is provided on one side of the substrate, such that the objective lens focuses the light at an exposed surface of the layer. Since the light is focused inside the higher-refractive-index material, a size of the focused spot can be made even smaller, thereby achieving a high-density recording/reproducing of information.

According to another aspect of the present invention, a solid-immersion lens is formed on one side of the substrate as an integral part thereof while the objective lens is provided on an opposite side of the substrate, and the solid-immersion lens and the objective lens are aligned with each other with regard to an optical axis thereof. This configuration eliminates a need for an optical-axis adjustment and a possibility of positional displacement while attaining a small spot size, thereby achieving a high-density recording/reproducing of information.

According to another aspect of the present invention, a semiconductor manufacturing process is employed to form an objective lens on one side of a substrate and a solid-immersion lens on an opposite side of the substrate, wherein the objective lens is created as a convex surface formed on a surface of the substrate, and the solid-immersion lens is formed by making a recess having a curved surface in a surface of the substrate and depositing a material having a refractive index higher than that of the substrate. An optical-pick-up device is thus readily created with high precision at a low cost. Since the solid-immersion lens has a higher refractive index than the substrate, a small beam spot can be created.

According to another aspect of the present invention, an objective lens is formed by making a recess having a curved surface in a surface of the substrate and by depositing a material having a refractive index higher than that of the substrate. An optical-pick-up device is thus readily created with high precision at a low cost. Further, since the substrate having the objective lens as an integral part thereof has a flat surface on the side where the objective lens is situated, an overlaid structure can be adopted to place other optical devices on the flat surface.

According to another aspect of the present invention, a semiconductor manufacturing process is employed to provide a first substrate with an objective lens, provide a second substrate with a solid-immersion lens having a refractive index higher than that of the first substrate, and combine the first substrate with the second substrate so as to align optical axes between the objective lens and the solid-immersion lens. Since light is focused inside the solid-immersion lens having a high refractive index, a high-density recording/reproducing can be achieved. Further, an integrated structure obtained by combining the first substrate and the second substrate eliminates a need for an excessive structure for an optical-axis adjustment, thereby facilitating making of a smaller and lighter optical device.

According to another aspect of the present invention, the second substrate described above has in its entirety a refractive index higher than that of the first substrate. A desirable small spot size can also be obtained in such a configuration.

According to another aspect of the present invention, the objective lens and the solid-immersion lens described above may be created by either forming a convex surface on a surface of the substrate or forming a recess having a curved surface in a surface of the substrate and subsequently filling a material having a higher refractive index than the substrate in the created recess. An optical-pick-up device is thus readily created with high precision at a low cost.

According to another aspect of the present invention, a plurality of pairs, each of which is comprised of the objective lens and the solid-immersion lens described above, are created and arranged in an array form. Since the plurality of pairs can be simultaneously created, the cost of the manufacturing process can be reduced.

According to another aspect of the present invention, an optical-pick-up device is structured such that an objective lens and a solid-immersion lens are formed in a substrate so as to have an aligned optical axis. Further, a polarization unit (e.g., a quarter-wave plate) is situated on the objective lens, and a beam deviating unit for changing a direction in which light travels is provided on the polarization unit. All of these lenses and units together with the substrate form a single integrated composite so as to facilitate making of a smaller and lighter device and accurate inputting/outputting of light from/to an exterior device.

According to another aspect of the present invention, an optical-pick-up assembly includes a light emitting unit and a light detecting unit in addition to the optical-pick-up device described above, wherein the light emitting unit and the light detecting unit are formed on the substrate. All of the lenses and units together with the substrate form a single integrated composite so as to facilitate making of a smaller and lighter device. Further, since all the optical elements are provided on the substrate, no alignment of optical axes is necessary.

According to another aspect of the present invention, an optical-pick-up assembly having all the elements described above may be formed by using a plurality of substrates and combining these substrates to form a single integrated composite.

According to another aspect of the present invention, a layer of photosensitive resin is formed on a surface of a substrate, and, then, diffused light is cast on the layer of photosensitive resin to create a recess having a curved surface in the layer. Then, dry etching (isotropic or anisotropic) is performed on the photosensitive resin and the substrate so as to form a recess equivalent to the above recess in the substrate. A material having a refractive index higher than that of the substrate is then filled in the recess to create a flat-surface lens. Because of the flat surface structure, other optical devices can be overlaid on the lens.

According to another aspect of the present invention, a pattern mask for forming a pattern on the photosensitive resin is provided with a light diffusing function, so that the pattern mask can be mounted in a conventional exposure device for manufacturing semiconductor devices.

According to another aspect of the present invention, a light diffusing plate has some portions thereof provided with a light diffusing function and other portions thereof being transparent. This configuration makes it possible to create a flat-surface lens ensconced in a concave surface and a pattern having a rectangular cross section in the same process.

According to another aspect of the present invention, a light diffusing plate for diffusing light is comprised of a diffraction grating. Mounting of the diffraction grating on the pattern mask allows use of a conventional exposure device while achieving a desired light-intensity distribution to create a lens of a desired shape.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

First Embodiment

Figure 1:
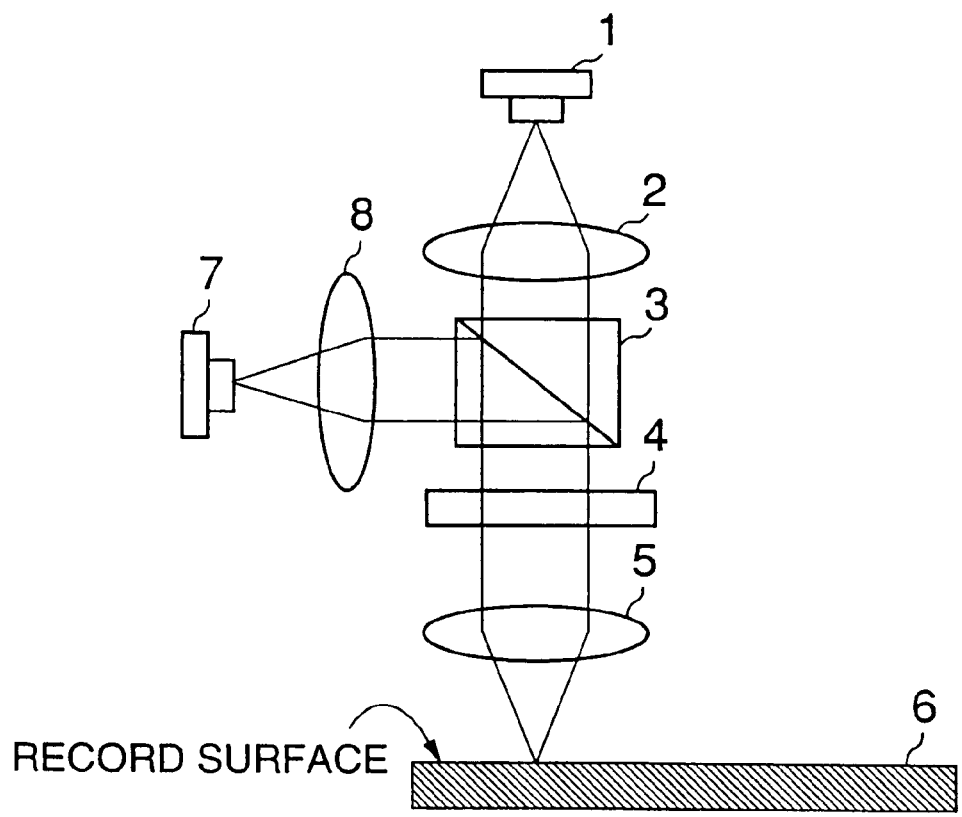
FIG. 1 is an illustrative drawing showing a related-art optical-pick-up assembly used for an optical memory.
Figure 2A:
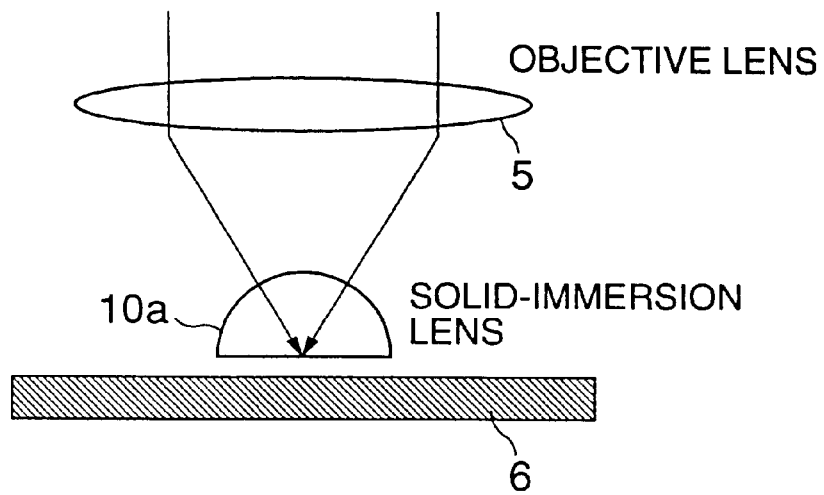
FIGS. 2A and 2B are illustrative drawings showing a configuration of use of a solid-immersion lens in the related art.
Figure 2B:
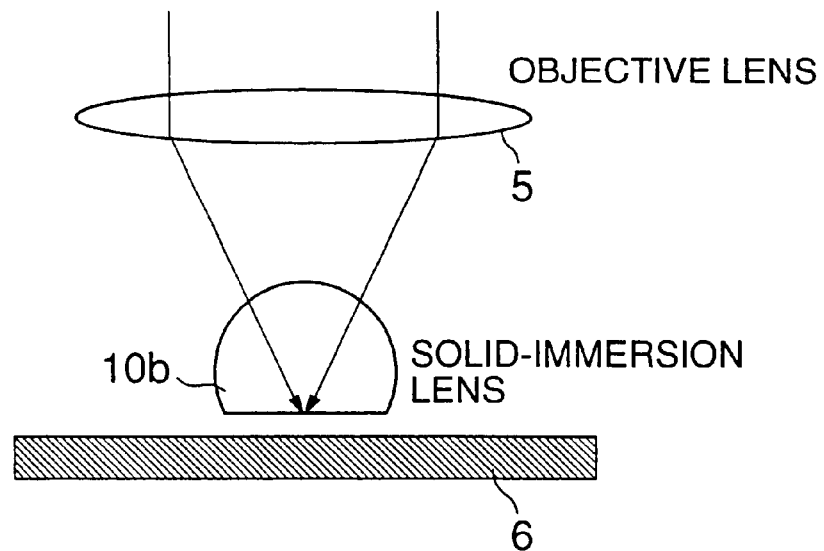
Figure 3:
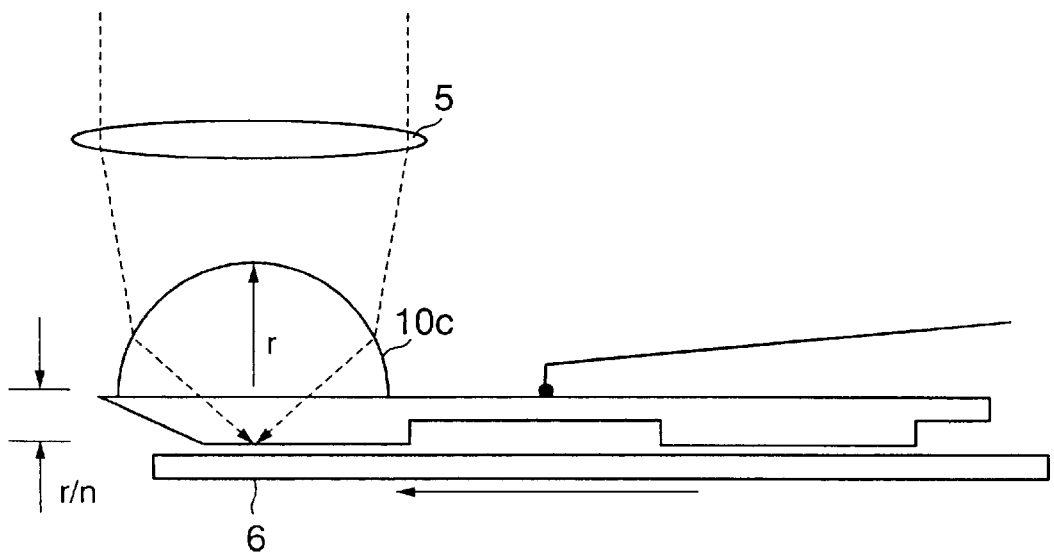
FIG. 3 is an illustrative drawing showing a related-art airborne head.
Figure 4:
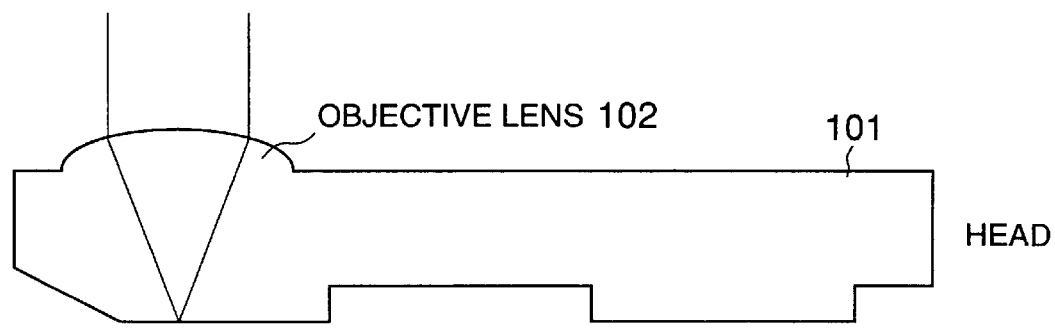
FIG. 4 is an illustrative drawing showing a configuration of an optical-pick-up device according to a first embodiment of the present invention.

FIG. 4 is an illustrative drawing showing a configuration of an optical-pick-up device according to a first embodiment of the present invention.

The optical-pick-up device of FIG. 4 includes a substrate 101 and an objective lens 102 for converging a coherent collimated light beam. The objective lens 102 is integrally formed with the substrate 101 as an upper portion of the substrate 101. A thickness of the substrate 101 at the position of the objective lens 102 is designed to be the same as a focus distance of the objective lens 102.

In the optical-pick-up device described above, the collimated light beam converges through the objective lens 102, forming a focused spot at a bottom surface of the substrate 101. As can be seen from the figure, the first embodiment does not have a solid-immersion lens. Since the spot is formed inside the substrate 101, however, a wavelength inside the substrate 101 determines the size of the spot, and is multiplication of the original wavelength by an inverse of a refractive index of the substrate 101. In this case, therefore, the size of the spot is determined by the equation (2) previously described.

The substrate 101 having the objective lens 102 formed therein is used as an optical device forming part of a recording reproduction unit of an optical memory device. The optical device in such a configuration is provided with an actuator for positioning of the optical device, a light source, and a light detecting unit (not shown). A lower surface of the substrate 101 in FIG. 4 may have a pattern (not shown) such that the substrate 101 can be afloat over a recording medium while maintaining a desired gap. Alternately, the actuator may control the gap between the optical-pick-up device and the recording medium, or any other appropriate scheme may be employed to maintain the gap at an appropriate length.

Second Embodiment

Figure 5:
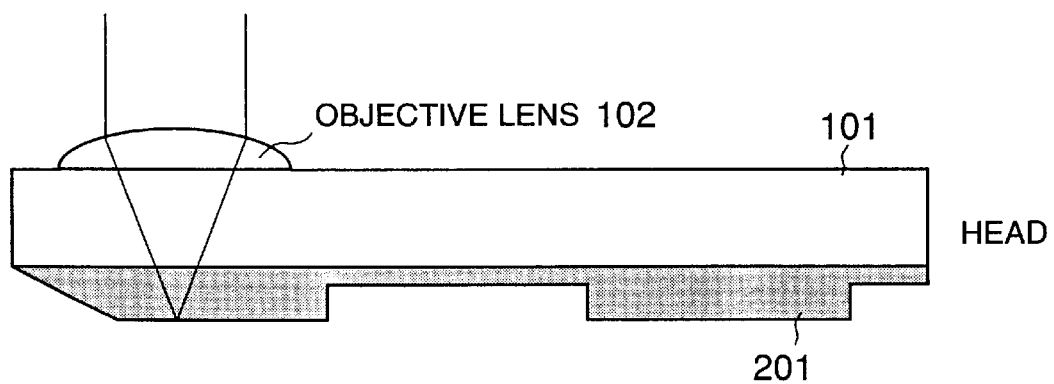
FIG. 5 is an illustrative drawing showing a configuration of an optical-pick-up device according to a second embodiment of the present invention.

FIG. 5 is an illustrative drawing showing a configuration of an optical-pick-up device according to a second embodiment of the present invention. The optical-pick-up device of FIG. 5 has a high-refractive-index layer 201 at the bottom of the substrate 101 in addition to the configuration of FIG. 4.

Since the high-refractive-index layer 201 is positioned where the objective lens 102 forms a focused beam, the size of the focused beam is represented as the equation (2) previously described. The wavelength of light inside the high-refractive-index layer 201 is a multiplication of the original wavelength by a reciprocal of the refractive index, so that a smaller spot size can be achieved.

Third Embodiment

Figure 6:
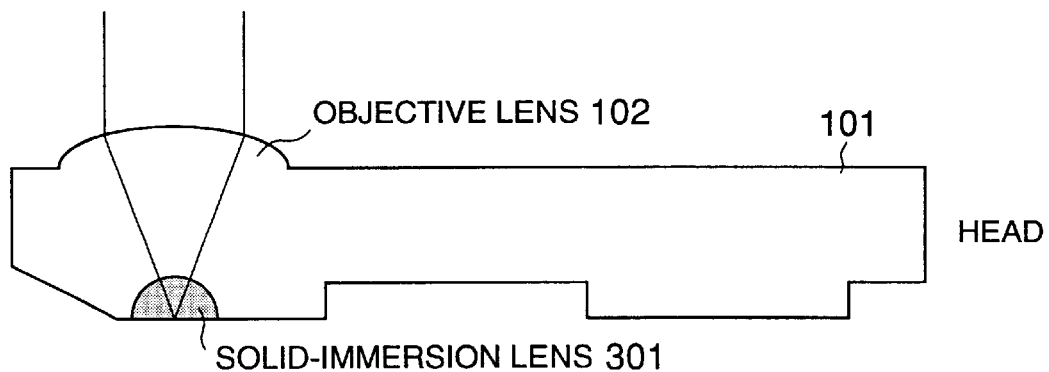
FIG. 6 is an illustrative drawing showing a configuration of an optical-pick-up device according to a third embodiment of the present invention.

FIG. 6 is an illustrative drawing showing a configuration of an optical-pick-up device according to a third embodiment of the present invention.

The optical-pick-up device of FIG. 6 includes the objective lens 102 and a solid-immersion lens 301, both of which are formed in the substrate 101. The objective lens 102 serves to concentrate a collimated light beam. The solid-immersion lens 301 has an optical axis aligned with that of the objective lens 102, and is provided at a portion nearest to the recording medium. The solid-immersion lens 301 has a refractive index higher than that of the substrate 101.

As described above, the substrate 101 of the third embodiment includes the objective lens 102 on the upper-surface side thereof and the solid-immersion lens 301 on the lower-surface side thereof.

The objective lens 102 may have a spherical surface, or may have a surface of another shape taking into account aberration. The solid-immersion lens 301 may have a hemisphere shape or a super-hemisphere shape as long as an effect of refraction is obtained. In the configuration of FIG. 6, only the solid-immersion lens 301 has a refractive index which is different from that of the substrate 101. Further, a thickness of the substrate 101 with respect to this optical system is such that a minimum spot size can be obtained at the bottom of the substrate 101.

In this configuration, the spot size of the beam can be made smaller by using a larger refractive index in accordance with the equations (2) and (3). Because of this, the solid-immersion lens 301 should be made of a material which has a refractive index at least larger than that of the substrate 101.

For example, the substrate 101 may be made of BK7 (a refractive index of which is 1.5115 with respect to the wavelength of 768.2 nm), and the solid-immersion lens 301 may be made of LaF2 (a refractive index of which is 1.7335 with respect to the wavelength of 768.2 nm). Alternately, the material of the solid-immersion lens 301 may be SFS1 (a refractive index of which is 1.8927 with respect to the wavelength of 768.2 nm).

Figure 7:
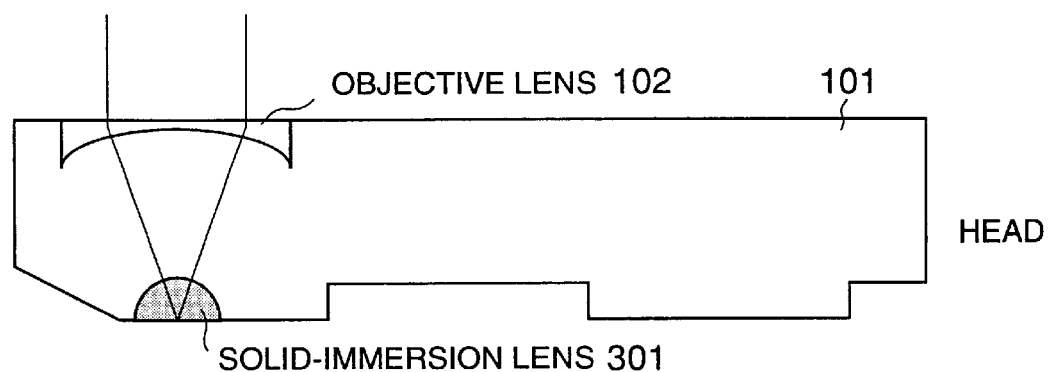
FIG. 7 is an illustrative drawing showing a variation of the optical-pick-up device according to the third embodiment of the present invention.

FIG. 7 is an illustrative drawing showing a variation of the optical-pick-up device according to the third embodiment of the present invention.

In FIG. 7, the objective lens 102 is formed such that the same conditions as those of FIG. 6 are achieved, except that the objective lens 102 has a convex surface thereof positioned below the upper surface of the substrate 101.

Fourth Embodiment

In the following, a method of forming an objective lens and a solid-immersion lens will be described. In this method, the objective lens is created by forming a convex surface on one side of a substrate, and the solid-immersion lens is created by forming a concave surface on the other side of the substrate and by depositing material in a recess of this concave surface by using the material having a refractive index higher than that of the substrate.

Material for the objective lens 102 may be selected depending on the wavelength of the collimated light incoming to the optical-pick-up device. For example, as previously described, the substrate 101 may be made of BK7 (a refractive index of which is 1.5115 with respect to the wavelength of 768.2 nm). In this case, the solid-immersion lens 301 may be made of LaF2 (a refractive index of which is 1.7335 with respect to the wavelength of 768.2 nm). Alternately, the material of the solid-immersion lens 301 may be SFS1 (a refractive index of which is 1.8927 with respect to the wavelength of 768.2 nm). The objective lens 102 is created on one side of the substrate by following a procedure described below.

FIG. 8 through FIG. 17 are illustrative drawings showing steps of creating an optical-pick-up device according to the fourth embodiment of the present invention. The objective lens 102 is formed on one side of the substrate as follows.

Step 1

Figure 8:
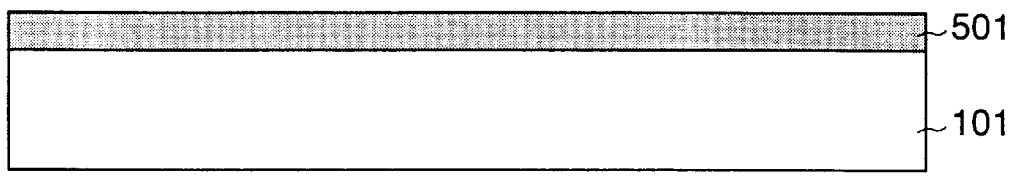
FIG. 8 through FIG. 17 are illustrative drawings showing steps of creating an optical-pick-up device according to a fourth embodiment of the present invention.

Photosensitive material 501 is applied to a surface of the substrate 101 as shown in FIG. 8. The thickness of the photosensitive material 501 is determined by taking into account a desired height of the resulting objective lens and a ratio (selectivity) of an etching speed of the substrate to an etching speed of resist, as the photosensitive material 501 is used as the resist in an etching process. If both etching speeds are identical (i.e., the selectivity is 1), for example, the thickness of the resist is set to the same height as that of the resulting objective lens. If the etching speed of the substrate is twice as fast as that of the resist (i.e., the selectivity is 2), for example, the thickness of the resist is half the height of the resulting objective lens.

Photo-resist conventionally used in semiconductor manufacturing processes may be used as the photosensitive material 501 applied to the substrate 101. Alternately, a photosensitive dry film may be used. In detail, materials such as OFPR-800 (positive-type resist) or OMR-85 (negative-type resist) may be used. Depending on whether a positive-type resist or a negative-type resist is used, a shape of a photomask used in a process (photolithography process) is changed in order to create an appropriate resist pattern. The basic procedure, however, remains the same. In this embodiment, use of a positive-type resist is taken as an example.

Step 2

Figure 9:
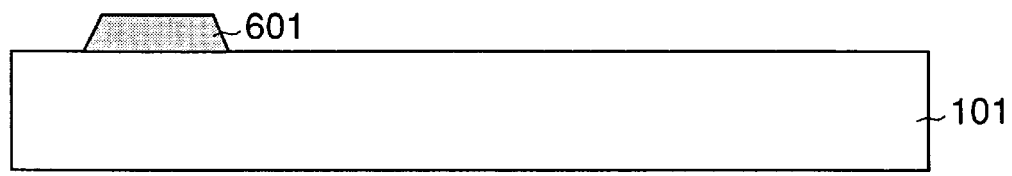

In FIG. 9, the photosensitive material 501 is exposed to light passing through a mask (photomask) having a pattern equivalent to the objective lens. After this, a development process is performed to leave a patterned resin 601 on the substrate 101. The patterned resin 601 is equivalent to the objective lens.

Step 3

Figure 10:
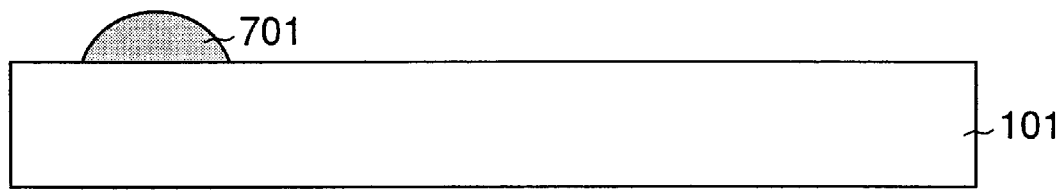

In FIG. 10, heat and/or pressure is applied to the patterned resin 601 left on the substrate 101, so that the patterned resin 601 is formed into a lens shape 701 under the effects of a gravitational force and a surface tension. The applied heat and pressure depend on the shape of the resist. Usually, a temperature ranging between 200° C. and 400° C. and a pressure between 1 atmospheric pressure and 10 atmospheric pressure are applied.

Step 4

The substrate glass is etched (anisotropic etching) in a vertical direction by using the resin of the lens shape 701 as a mask. A dry etching process conventionally used in a semiconductor manufacturing process may be employed for the etching. In detail, reactive-ion etching or electro-cyclotron-reverberation etching may be used. Gases used for dry etching may be chosen in accordance with the material of the substrate.

Figure 11:
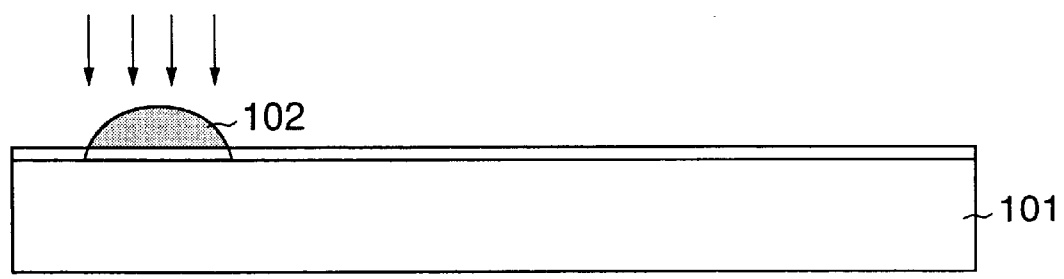

If the substrate is made of glass, $CF_4$ or $CHF_3$ may be used. Further, gasses such as $N_2$, $O_2$, or Ar may be added to the above-identified gasses in order to adjust etching speed and selectivity. After this etching process, the objective lens 102 is formed on the substrate 101 as shown in FIG. 11.

Step 5

A concave-surface-based lens having a refractive index higher than that of the substrate 101 is formed on the side of the substrate 101 opposite to the side where the objective lens 102 has been formed. The formation of the concave-surface-based lens basically follows the same procedure as that for forming the convex lens described above. In the embodiment, use of a negative-type resist is taken as an example.

Figure 12:
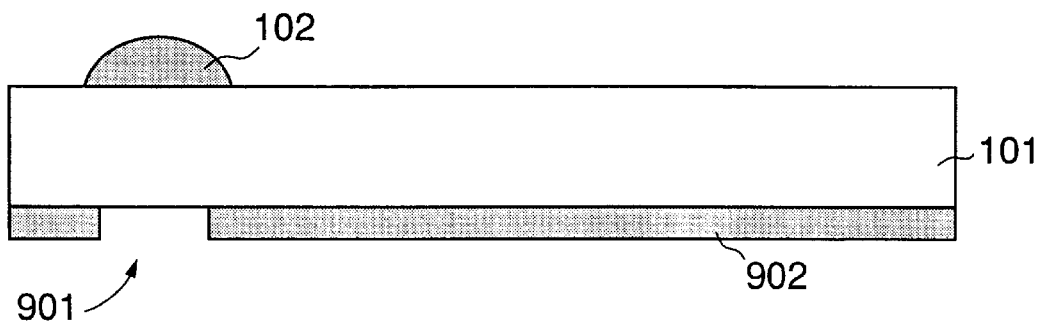

As shown in FIG. 12, a negative-type resist is applied to the side of the substrate 101 where a solid-immersion lens is to be created, and, then, a photolithography process is conducted to leave resin 902 except for a portion 901 where the solid-immersion lens is to be created.

Step 6

Figure 13:
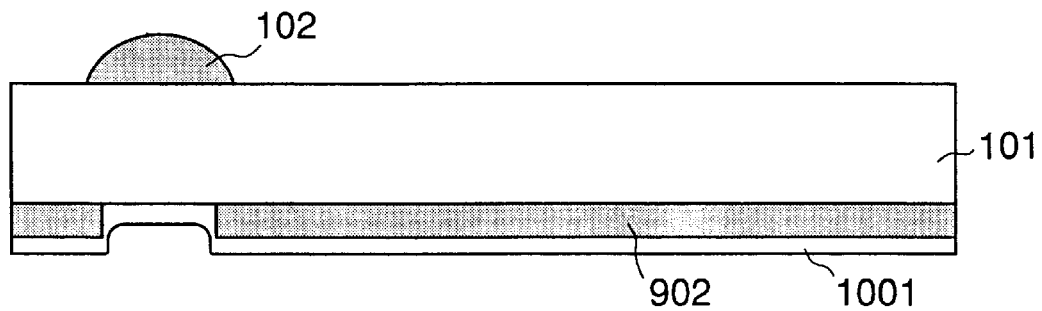

As shown in FIG. 13, resist 1001 is applied all over the portion 901 and the resin 902. The resist 1001 is provided for the purpose of facilitating heat-caused deformation of the resin 902, and may be a relatively thin layer. In practice, the layer may be set to an appropriate thickness less than 5 microns.

Step 7

Figure 14:
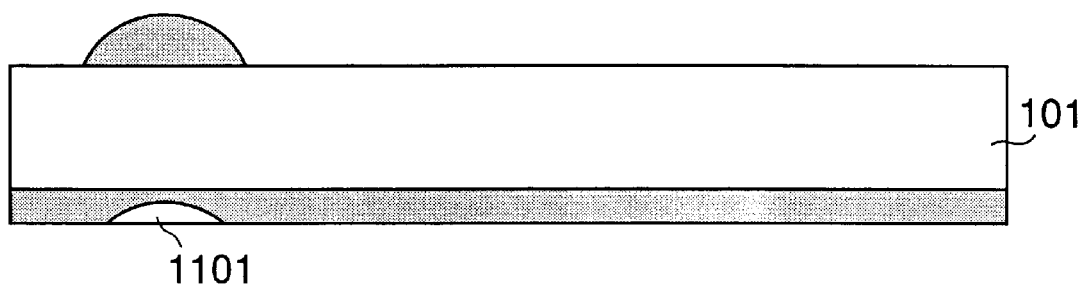

As shown in FIG. 14, applied heat and/or pressure deform the resin 901 in the same manner as previously described, so that a concave shape 1101 is created.

Step 8

Figure 15:
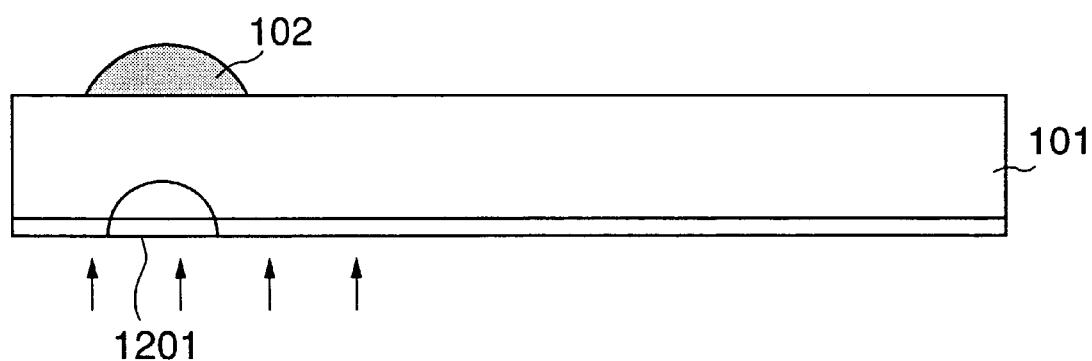

An etching process forms a concave-shape portion 1201 in the substrate 101 as shown in FIG. 15.

Step 9

Figure 16:
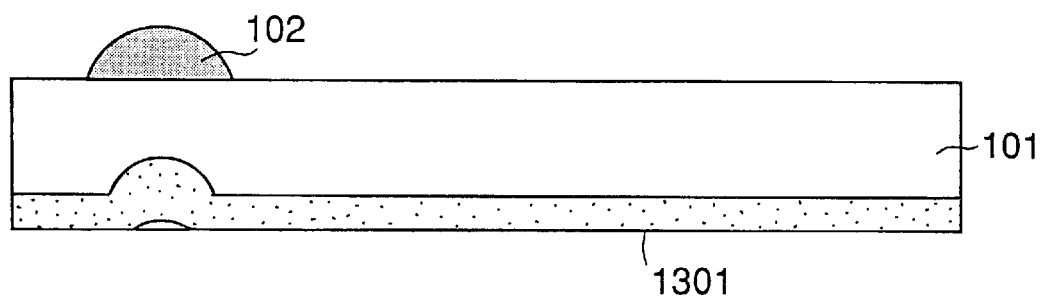

As shown in FIG. 16, material having a refractive index higher than that of the substrate 101 is filled into the concave-shape portion 1201. In this embodiment, a sputter method is employed to form a sputter layer 1301 on the side of the substrate 101 where the concave-shape portion 1201 is situated by using a material having a desired refractive index.

Step 10

Figure 17:
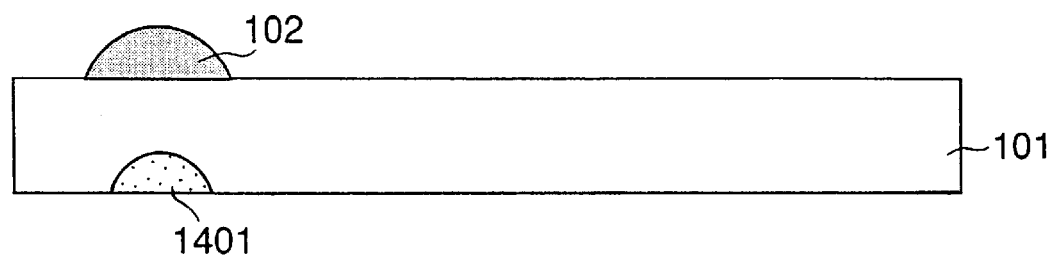

As shown in FIG. 17, a sputter layer 1401 is selectively left inside the concave-shape portion 1201 after etching-back and smoothing of the surface.

In this manner, the steps of FIG. 8 through FIG. 17 can manufacture the optical-pick-up device. In practice, a number of heads are created and arranged in an array on the substrate 101, so that the substrate 101 needs to be cut into individual head pieces.

Fifth Embodiment

Figure 18:
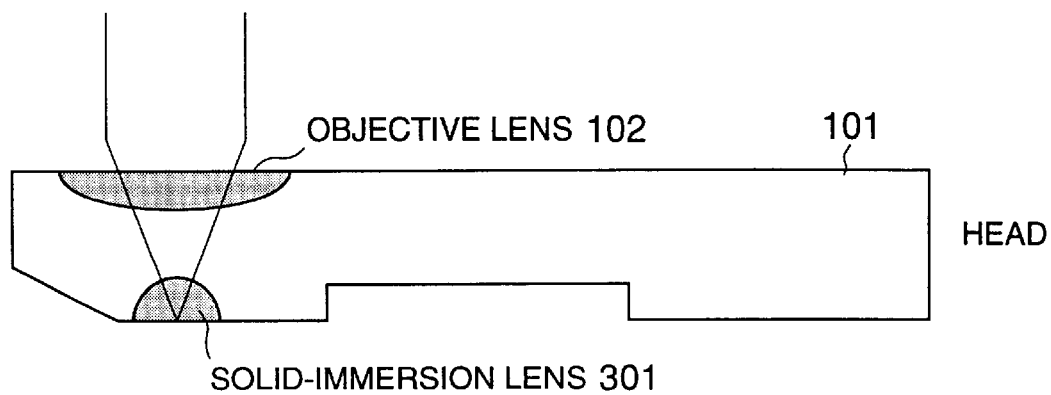
FIG. 18 is an illustrative drawing showing a configuration of an optical-pick-up device according to a fifth embodiment of the present invention.

FIG. 18 is an illustrative drawing showing a configuration of an optical-pick-up device according to a fifth embodiment of the present invention.

The optical-pick-up device of FIG. 18 has an objective lens which is ensconced in a concave-shape recess formed in the surface of the substrate 101 while the objective lens of the previous embodiments has a convex shape with respect to the surface of the substrate 101. In this embodiment, the objective lens 102 and the solid-immersion lens 301 have higher refractive indexes than the substrate 101. The thickness of the substrate 101 is such that this optical system achieves a minimum spot size at the bottom of the substrate 101.

Sixth Embodiment

A method of forming an objective lens and a solid-immersion lens will be described. In this method, the objective lens and the solid-immersion lens are created by forming a concave portion on either side of the substrate and by depositing material in a recess of each concave portion by using the material having a refractive index higher than that of the substrate.

Here, the method of creating the objective lens 102 and the solid-immersion lens 301 as concave-surface-based lenses can follow the same steps as in the fourth embodiment.

Namely, a negative-type resist is applied to the side of the substrate 101 where the objective lens 102 is to be created, and, then, a photolithography process is conducted to leave resin except for a portion where the objective lens 102 is to be created.

Then, resist is applied all over the resin and the portion where the objective lens 102 is to be formed. The resist is provided for the purpose of facilitating heat-caused deformation of the resin, and may be a relatively thin layer. In practice, the layer may be set to an appropriate thickness less than 5 microns.

Applied heat and/or pressure deform the resin so as to create a concave shape in the resin. Conventional anisotropic etching is then applied to form a concave shape in the substrate 101.

Material having a refractive index higher than that of the substrate 101 is filled into the concave-shape portion formed in the substrate 101. Namely, the sputter method is employed to create a sputter layer on the side of the substrate 101 where the concave-shape portion is situated by using material having a desired refractive index. Etch-back and smoothing of the surface then selectively leave a portion of the sputter layer inside the concave-shape portion, thereby creating a concave-surface-based objective lens having a higher refractive index than the substrate.

The solid-immersion lens on the other side of the substrate 101 can be created by the same steps as described above. In practice, a number of heads are created and arranged in an array on the substrate 101, so that the substrate 101 needs to be cut into individual head pieces.

Seventh Embodiment

This embodiment connects the substrate 101 having the objective lens 102 with another substrate having the solid-immersion lens 301 so as to create an integrated composite. As in the previous embodiments, the objective lens 102 serves to concentrate a collimated light beam. The solid-immersion lens 301 is situated near to the recording medium, and has a refractive index higher than that of the substrate.

Figure 19:
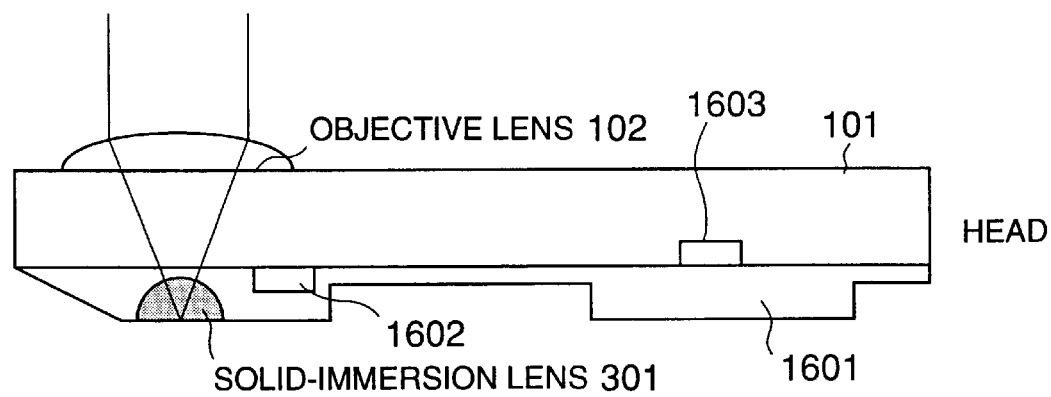
FIG. 19 is an illustrative drawing showing a configuration of an optical-pick-up device according to a seventh embodiment of the present invention.

FIG. 19 is an illustrative drawing showing a configuration of an optical-pick-up device according to a seventh embodiment of the present invention. The optical-pick-up device of FIG. 19 includes the substrate 101 having the objective lens 102 and a substrate 1601 having the solid-immersion lens 301.

The substrate 101 provided with the objective lens 102 has a protrusion 1602 on a bottom surface thereof nearer to a left-side edge, and the substrate 1601 provided with the solid-immersion lens 301 has a protrusion 1603 on an upper surface thereof nearer to a right-side edge. The protrusion 1602 and the protrusion 1603 fit into recesses which are formed in opposing surfaces of the substrate 1601 and the substrate 101, respectively. The fitting serves to achieve relative positioning of the substrate 101 and the substrate 1601. Shapes of the protrusions and the recesses are not limited to one configuration, but can have any configuration as long as those shapes provide easy fitting. As is apparent, also, the number of the protrusions and the recesses are not limited to two, but can be any number.

In order to achieve a secure fix between the two substrates, glue or an electrochemical means may be employed. Further, the protrusions and the recesses should avoid positions where light travels between the objective lens 102 and the solid-immersion lens 301.

Figure 20:
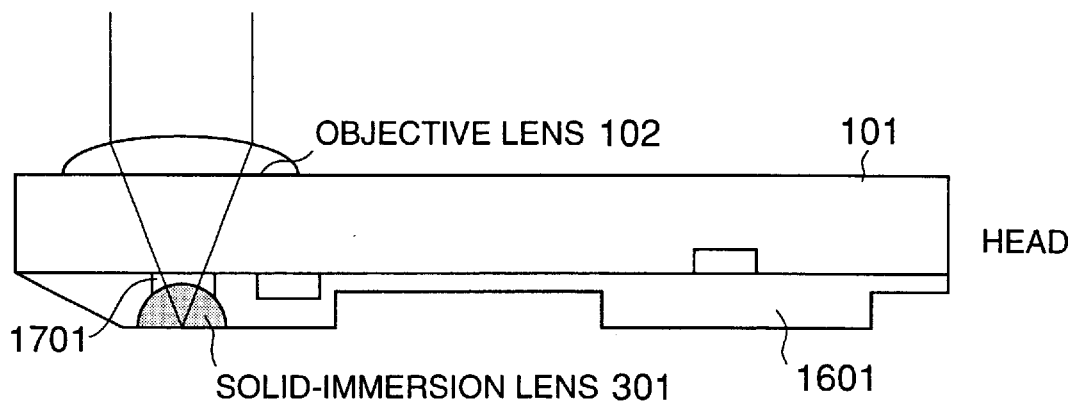
FIG. 20 is an illustrative drawing showing a first variation of the optical-pick-up device according to the seventh embodiment of the present invention.

FIG. 20 is an illustrative drawing showing a first variation of the optical-pick-up device according to the seventh embodiment of the present invention. The configuration of FIG. 20 has a hollow portion 1701 provided in the substrate 1601 over the solid-immersion lens 301.

Figure 21:
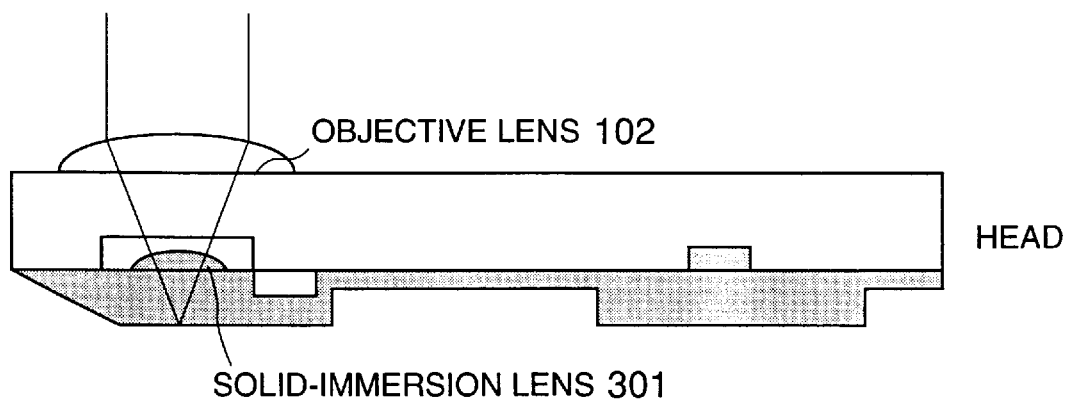
FIG. 21 is an illustrative drawing showing a second variation of the optical-pick-up device according to the seventh embodiment of the present invention.

FIG. 21 is an illustrative drawing showing a second variation of the optical-pick-up device according to the seventh embodiment of the present invention. In this variation, the solid-immersion lens 301 is provided to project from the upper surface of the substrate 1601, and is positioned inside a recess which is provided in the substrate 101 on the bottom side thereof.

Figure 22:
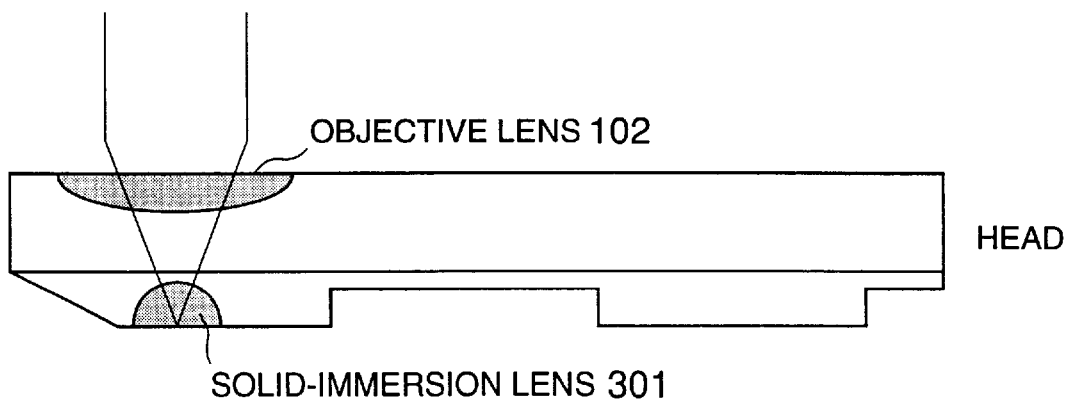
FIG. 22 is an illustrative drawing showing a third variation of the optical-pick-up device according to the seventh embodiment of the present invention.

FIG. 22 is an illustrative drawing showing a third variation of the optical-pick-up device according to the seventh embodiment of the present invention. The optical-pick-up device of this variation includes two substrates as in the seventh embodiment, but is provided with the objective lens 102 having a convex surface facing downward. The two substrates are provided with protrusions and recesses (not shown) for relative positioning of the two substrates as in the seventh embodiments. These protrusions are fit into the recesses to obtain a head as shown in the figure.

The protrusions and the recesses are not limited to a particular shape, by can be of any shape as long as the protrusions are easily fit into the recesses. Further, the number of the protrusions and the recesses can be any number. As a mechanism to securely fix the two substrates together, glue or an electro-chemical means may be employed.

A due consideration should be given to preventing protrusions and the recesses from being placed where a light beam travels when passing through the objective lens 102 and the solid-immersion lens 301.

In the above embodiment and variations, protrusions and recesses are formed for the purpose of connecting the two substrates together. Alternately, a plurality of markers may be provided, and the two substrates are connected together by using the markers as reference points in positioning.

Eighth Embodiment

Figure 24A:
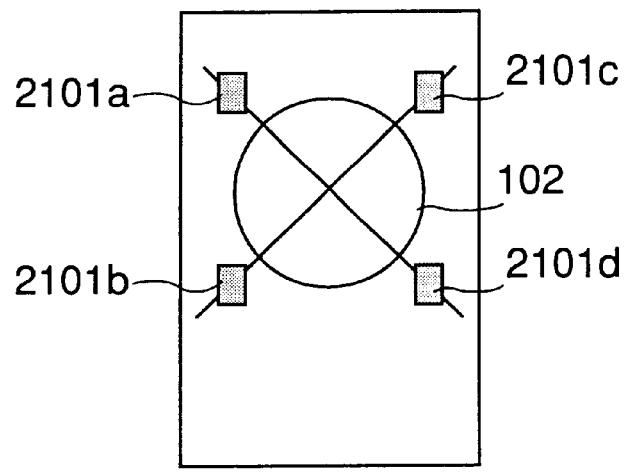
FIGS. 24A and 24B are illustrative drawings for explaining alignment of optical axes during a manufacturing process of an optical-pick-up device according to an eighth embodiment of the present invention.
Figure 24B:
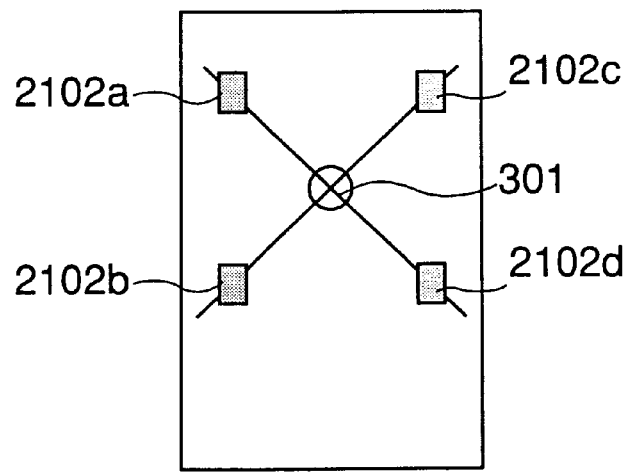

FIGS. 24A and 24B are illustrative drawings for explaining alignment of optical axes during the manufacturing process of optical-pick-up devices according to an eighth embodiment of the present invention. Here, exact alignment of optical axes has to be achieved when the two substrates having the objective lens 102 and the solid-immersion lens 301 are connected together.

To this end, alignment units 2101a through 2101d are provided at positions encircling the optical axis of the objective lens, so that two units forming a pair oppose each other across the optical axis. On the substrate provided with the solid-immersion lens 301, similarly, alignment units 2102a through 2102d are positioned on a perimeter of a circle centering at the optical axis of the solid-immersion lens 301. The two substrates are then connected with each other such that the alignment units 2101a through 2101d match the alignment units 2102a through 2102d, respectively.

The alignment units may have three-dimensional structures such as protrusions and recesses as described in connection with FIG. 19 through FIG. 21. In order to make protrusions or recesses, a method of the fourth embodiment or the sixth embodiment, respectively, may be used in the same manner as when forming a convex-shape lens or a concave-surface-based lens.

Alternately, the alignment units may include markers. In this case, two-dimensional markers such as those shown in FIG. 25 may be used. These markers are conventionally used in semiconductor manufacturing processes, wherein markers having sufficient precision for alignment are formed on two substrates to be aligned, and two markers forming a respective pair are matched to achieve exact alignment.

These alignment markers may be created by utilizing a method of the fourth embodiment or the sixth embodiment for forming a convex-shape lens or a concave-surface-based lens, respectively, on a substrate. For example, a process of forming and subsequent etching of a metal layer, made of such a material as chrome, may be introduced to form the alignment markers as in conventional semiconductor manufacturing processes.

After the two substrates are positioned relative to each other such that two optical axes are aligned, the two substrates need to be fixedly connected. For this purpose, glue may be used. Alternately, electrochemical schemes such as anodic bonding or high-temperature bonding may be employed.

Ninth Embodiment

In the following, a description will be given with regard to an embodiment in which more than one pair of an objective lens and a solid-immersion lens or more than one objective lens are provided and arranged in an array.

Figure 26:
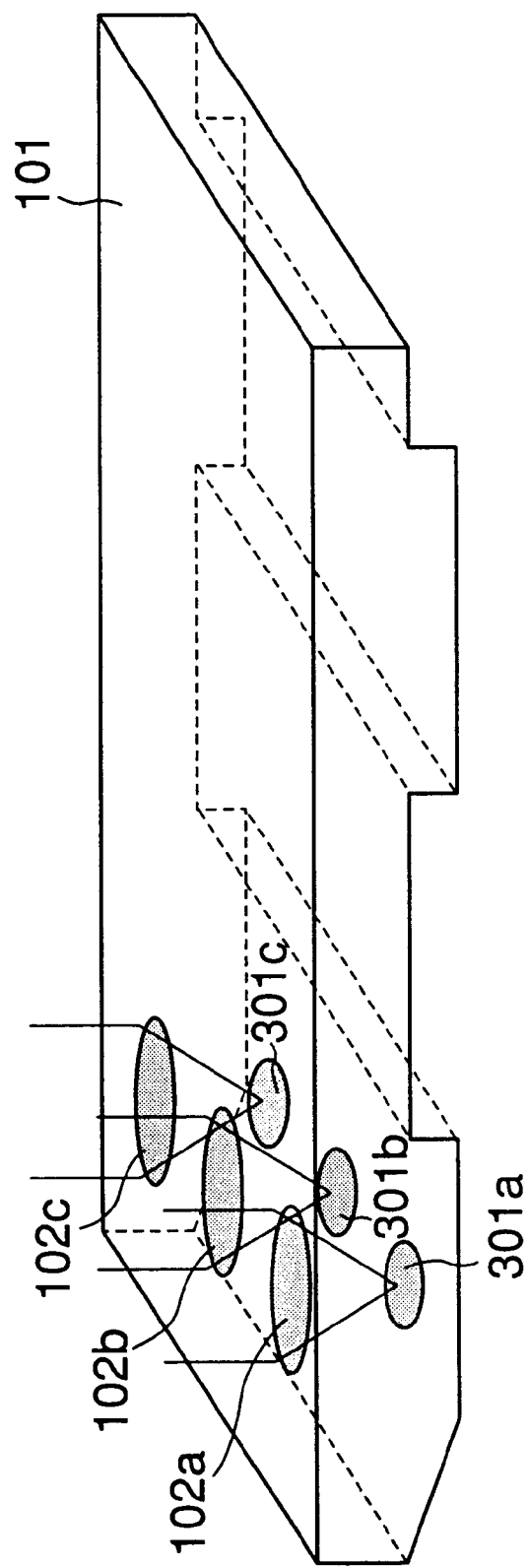
FIG. 26 is an illustrative drawing showing a configuration of an optical-pick-up device according to a ninth embodiment of the present invention.

FIG. 26 is an illustrative drawing showing a configuration of an optical-pick-up device according to a ninth embodiment of the present invention. The optical-pick-up device of FIG. 26 includes objective lenses 102a through 102c and solid-immersion lenses 301a through 301c, wherein a given objective lens forms a pair with a corresponding solid-immersion lens, and three pairs formed in such a manner are arranged in an array. The optical-pick-up device having this configuration can be manufactured by the method described in connection with the previous method embodiments.

This configuration creates three beam spots when collimated light beams are directed to an upper surface of the substrate 101. A light source in this case may be comprised of arrayed light sources arranged at positions corresponding to the arrayed lens, or may be a single light source which can illuminate all the arrayed lenses at a time. Use of arrayed light sources allows separate control of the light beams, thereby achieving independent operations with regard to recording, reproducing, and erasing. When a single light source is employed, information can be simultaneously reproduced, for example, from three different points.

Tenth Embodiment

Configuration

Figure 27:
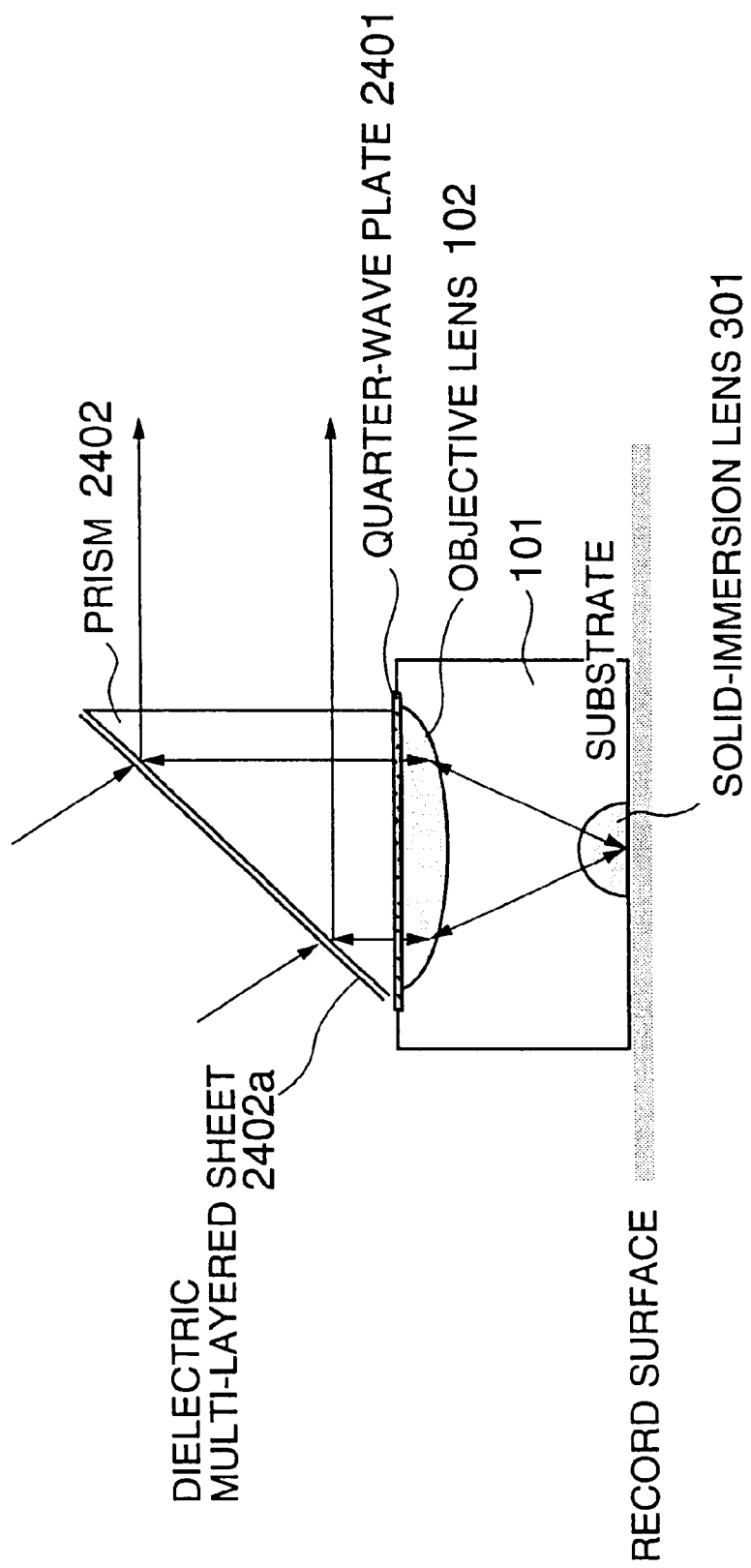
FIG. 27 is an illustrative drawing showing a configuration of an optical-pick-up device according to a tenth embodiment of the present invention.

FIG. 27 is an illustrative drawing showing a configuration of an optical-pick-up device according to a tenth embodiment of the present invention.

The optical-pick-up device of FIG. 27 includes the objective lens 102 and the solid-immersion lens 301 formed in the substrate 101. The objective lens 102 concentrates a collimated light beam supplied from a light source. The solid-immersion lens 301 is provided nearer to a recording medium, and has an optical axis aligned with that of the objective lens 102. Also, the solid-immersion lens 301 has a higher refractive index than the substrate 101. The optical-pick-up device further includes a quarter-wave plate 2401, which is provided over the objective lens 102 to serve as a polarization unit. Further, the optical-pick-up device includes a prism 2402, which is provided over the quarter-wave plate 2401 to serve as a beam deviating unit for changing a direction in which light travels. A dielectric multi-layer sheet 2402a is provided on a slanted surface of the prism 2402.

The objective lens 102 and the solid-immersion lens 301 are formed in the substrate 101, and are made of a material having a higher refractive index than the substrate 101 with an aim of drawing on an effect of refraction. The objective lens 102 and the solid-immersion lens 301 are aligned to each other with respect to an optical axis thereof.

When the solid-immersion lens 301 has a hemisphere shape, the solid-immersion lens 301 is positioned such that the objective lens 102 has a focal point at the flat-end surface of the solid-immersion lens 301. When the solid-immersion lens 301 has a shape of more than a half of a sphere (aberration in this case can be suppressed when the thickness of the lens is $r(1+1/n)$; r: radius, n: refractive index), the solid-immersion lens 301 is positioned such that the focal point of the objective lens 102 is set at a distance nr under a center of the sphere. This configuration achieves a light beam focused at the flat-end surface of the solid-immersion lens 301. The objective lens 102 has either a sphere surface or a non-sphere surface.

The material of the substrate 101 may be BK7 or glass. The solid-immersion lens 301 may be made of LaSFN18 (refractive index=1.90522, wavelength=656.3 nm, as described in a catalog of the SCHOTT corporation for your reference) or SF59 (refractive index=1.94325, wavelength= 656.3 nm, as described in a catalog of the SCHOTT corporation for your reference). The objective lens 102 and the solid-immersion lens 301 may be provided in separate substrates, which are then fixedly connected to each other so as to satisfy all the requirements specified above.

The quarter-wave plate 2401 may be formed by using a material having a birefringence characteristic so as to change polarization of light by a quarter wavelength between an ordinary ray and an extraordinary ray. A thickness of the quarter-wave plate 2401 should be $L/\{4(ne-no)\}$, wherein ne is a refractive index of the ordinary ray and no is a refractive index of the extraordinary ray. In the case of crystal, for example, a refractive index of an ordinary ray is 1.538, and a refractive index of an extraordinary ray is 1.547. When crystal is used, therefore, the thickness of the quarter-wave plate 2401 is 17.58 $\mu$m for light having a wavelength of 362.8 nm.

The prism 2402 has the dielectric multilayered sheet 2402a formed on the slanted surface thereof. Drawing on the fact that light of different polarization (P polarization and S polarization) has different reflection indexes and different transparency indexes, the dielectric multilayered sheet 2402a provides different routes for different light beams. Further, the prism 2402 has a surface thereof perpendicular to the substrate 101, and this surface has an AR coating layer thereon. The quarter-wave plate 2401 is glued to the prism 2402. The dielectric multilayered sheet 2402a is formed on the slanted surface of the prism 2402 by a vapor deposition process.

Operations of the Tenth Embodiment

In what follows, a description will be given with regard to operations of the optical-pick-up device having a configuration described above.

In FIG. 27, the collimated light beam is incident to the prism 2402. This collimated light beam is linearly polarized to have P polarization. The incident light beam is then directed downward in the figure. When the light beam passes through the quarter-wave plate 2401, a phase difference of $\pi/2$ arises between the ordinary ray and the extraordinary ray, so that the light beam ends up having a circular polarization. Here, the quarter-wave plate 2401 has an optical axis of the crystal thereof arranged at an angle of 45° relative to the orientation of incident-light polarization. Because of this, the light beam having a circular polarization converges through the objective lens 102, and is focused at the flat-end surface of the solid-immersion lens 301.

When data is read, the light beam is reflected by a surface of an optical recording medium, and is collimated by the objective lens 102. When passing through the quarter-wave plate 2401, the light beam has polarization thereof changed to an S polarization, and is reflected by the slanted surface of the prism 2402 (i.e., by the dielectric multilayered sheet 2402a) to travel to the right in FIG. 27.

Eleventh Embodiment

Configuration

Figure 28:
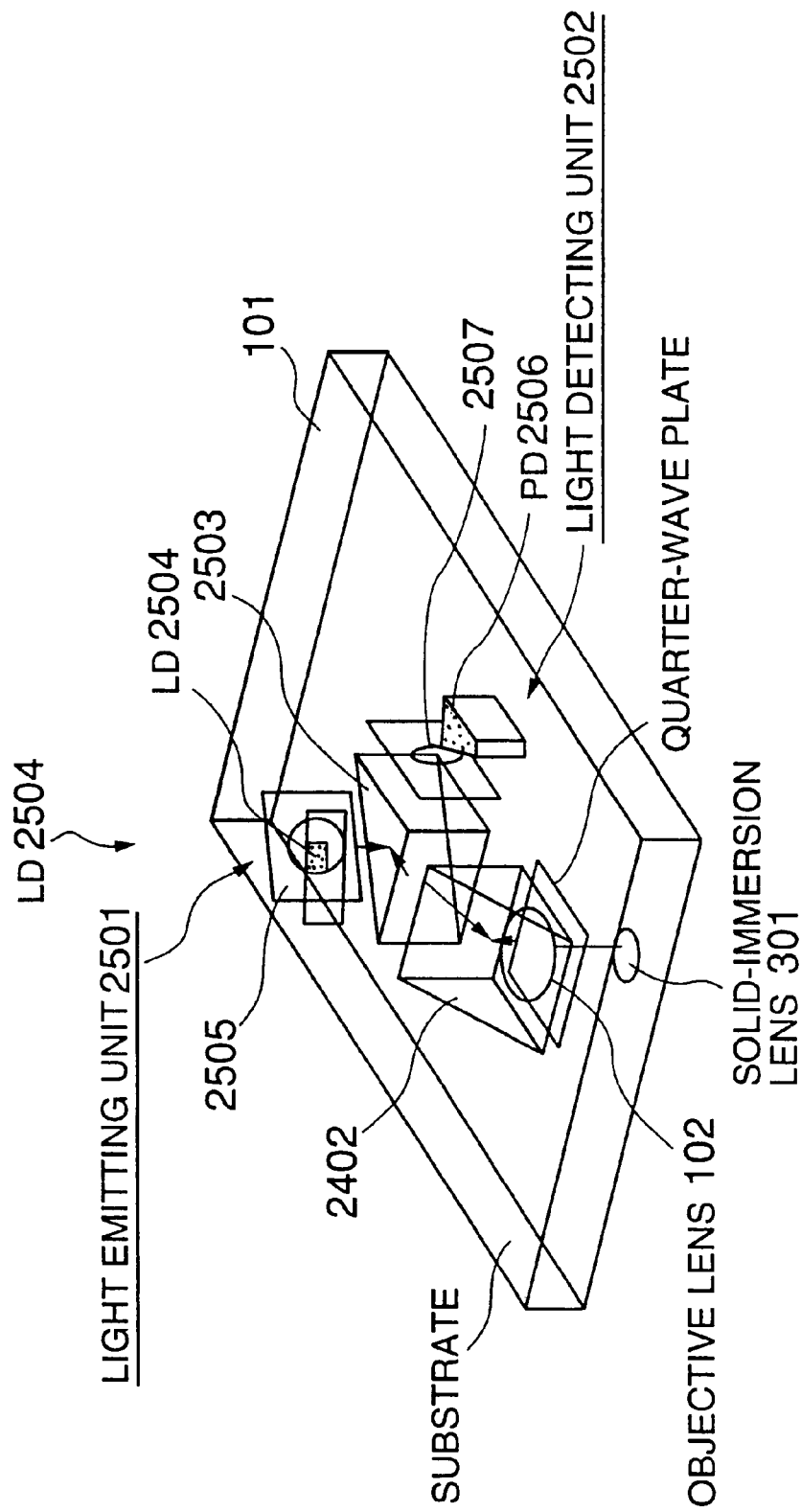
FIG. 28 is an illustrative drawing showing a configuration of an optical-pick-up assembly according to an eleventh embodiment of the present invention.

FIG. 28 is an illustrative drawing showing a configuration of an optical-pick-up assembly according to an eleventh embodiment of the present invention.

The optical-pick-up assembly of FIG. 28 includes the optical-pick-up device of the tenth embodiment, a light emitting unit 2501, a light detecting unit 2502, and a prism 2503, all of which are implemented in or on the substrate 101. Here, the prism 2503 serves as a polarized-beam splitter. The light emitting unit 2501 includes a LD (laser diode) 2504 and a collimator lens 2505, wherein the LD 2504 serves as a light emitting means. The light detecting unit 2502 includes a PD (photodiode) 2506 and a convergence lens 2507, wherein the PD 2506 serves as a light detecting means.

The collimator lens 2505 and the convergence lens 2507 are formed so as to have a flat-end surface, and are vertically arranged inside the substrate 101. The LD 2504 is arranged by using a copper block or the like. Such a block is also useful for releasing heat from the LD 2504. Alternately, an LD which is contained in a can may be used.

The PD 2506 is provided in a form of a semiconductor substrate vertically positioned on the substrate 101. Alternately, the PD 2506 may be contained in a can in the same manner as may be applied to the LD 2504. Electrical circuits for driving these devices may also be provided on the substrate 101. The prism 2402 has a coated layer on a slanted surface thereof such that the coated layer reflects all of the incoming light. Each of the prism 2402 and the prism 2503 has an AR-coating layer on a surface thereof which receives incident light.

The surface of the prism 2402 facing the substrate 101 is provided with the quarter-wave plate 2401 described in connection with the tenth embodiment. Under the quarter-wave plate 2401 is provided the objective lens 102. Relative positioning of the objective lens 102 and the solid-immersion lens 301 is the same as in the tenth embodiment. The collimator lens 2505, the convergence lens 2507, the LD 2504, and the PD 2506 are fixedly mounted with glue or the like after accurate positioning thereof using grooves etched in the substrate 101, for example.

Operations of Eleventh Embodiment

In the following, a description will be given with regard to operations of the optical-pick-up assembly described above.

In FIG. 28, a laser beam emitted from the LD 2504 is collimated by the collimator lens 2505 before entering the prism 2503. At this moment, the laser light has a linear polarization of P polarization. The light beam entering the prism 2503 experiences refraction on a slanted surface of the prism 2503 so as to travel toward the prism 2402. The prism 2402 reflects the light beam so that the light beam passes through the quarter-wave plate 2401. As this happens, a phase difference of $\pi/2$ is generated between an ordinary ray and an extraordinary ray, thereby providing the light beam with a circular polarization.

The quarter-wave plate 2401 has an optical axis of the crystal thereof arranged at an angle of 45° relative to the orientation of incident-light polarization. The light beam having a circular polarization then converges through the objective lens 102, and is focused at the flat-end surface of the solid-immersion lens 301. When data is read, the light beam is reflected by a surface of an optical recording medium, and is collimated by the objective lens 102 to pass through the quarter-wave plate 2401, where a state of polarization is changed to S polarization. Then, the light beam enters the prism 2503 via the prism 2402, and is reflected by the slanted surface of the prism 2503 since this light beam has S polarization. The light beam travels toward the convergence lens 2507, by which it is focused on the PD 2506.

In order to detect a focusing-error signal, either a knife-edge method or an astigmatism method may be used (not shown). Further, appropriate measures may be taken to detect tracking errors as they are deemed necessary.

Figure 29:
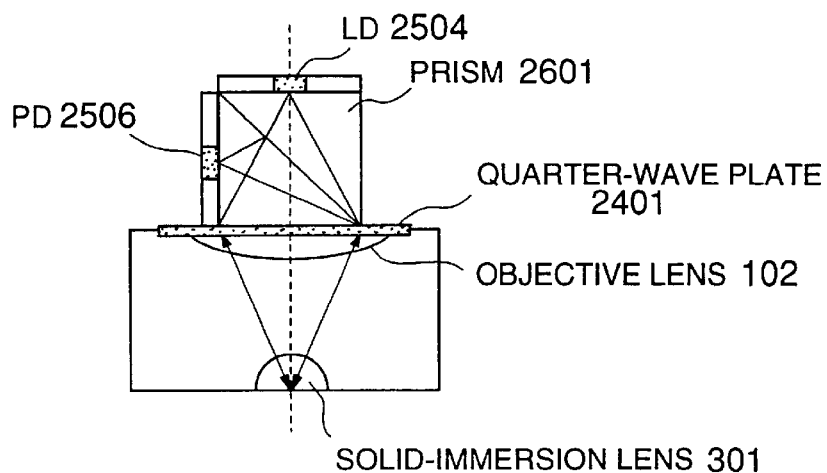
FIG. 29 is an illustrative drawing showing a configuration of an optical-pick-up assembly according to a variation of the eleventh embodiment.

Variation of Eleventh Embodiment
Configuration
FIG. 29 is an illustrative drawing showing a configuration of an optical-pick-up assembly according to a variation of the eleventh embodiment. This optical-pick-up assembly is based on a finite optical system. The optical-pick-up assembly of FIG. 29 differs from that of the eleventh embodiment in that the collimator lens and the convergence lens are removed. Namely, the optical-pick-up assembly includes the objective lens 102, the solid-immersion lens 301, the quarter-wave plate 2401, a prism 2601, the LD 2504, and the PD 2506, all of which are implemented in or on the substrate 101 in an integrated manner.

The prism 2601 has a dielectric multilayered sheet coated on a slanted surface thereof. The prism 2601 further has an AR-coating layer provided on surfaces thereof which come in contact with the LD 2504 and the PD 2506. In this example, these surfaces of the prism 2601 are subjected to etching to form grooves thereon, and the LD 2504 and the PD 2506 are glued to these grooves. Here, this example is not intended to limit the scope of the invention. Further, circuits for driving the LD 2504 and the PD 2506 are provided.
Operation In what follows, operations of the optical-pick-up assembly described above will be described. In FIG. 29, a laser beam emitted from the LD 2504 is incident into the prism 2601. In this case, the laser light is a diverging beam (i.e., not collimated), and has a linear polarization of P polarization. The light beam passes through the prism 2601 and the quarter-wave plate 2401. As this happens, a phase difference of $\pi/2$ is generated between an ordinary ray and an extraordinary ray, thereby providing the light beam with a circular polarization.

The quarter-wave plate 2401 has an optical axis of the crystal thereof arranged at an angle of 45° relative to the orientation of incident-light polarization. The light beam having a circular polarization then converges through the objective lens 102, and is focused at the flat-end surface of the solid-immersion lens 301. When data is read, the light beam is reflected by a surface of an optical recording medium, and is collimated by the objective lens 102 to pass through the quarter-wave plate 2401, where a state of polarization is changed to S polarization. Then, the light beam enters the prism 2601, and is reflected by the slanted surface of the prism 2601 since this light beam has S polarization. The light beam then converges on the PD 2506.

This embodiment does not need the collimator lens and the convergence lens which are necessary in the eleventh embodiment, so that the optical-pick-up assembly can be implemented in a simpler configuration.

In order to detect a focusing-error signal, either a knife-edge method or an astigmatism method may be used (not shown). Further, appropriate measures may be taken to detect tracking errors as they are deemed necessary.

Figure 30:
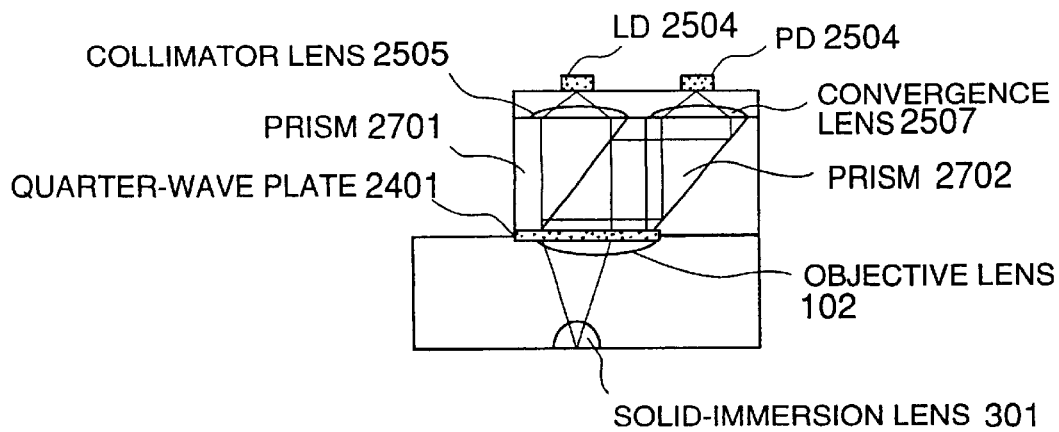
FIG. 30 is an illustrative drawing showing a configuration of an optical-pick-up assembly according to a twelfth embodiment of the present invention.

Twelfth Embodiment
Configuration
FIG. 30 is an illustrative drawing showing a configuration of an optical-pick-up assembly according to a twelfth embodiment of the present invention.

The optical-pick-up assembly of FIG. 30 includes the substrate 101 having the objective lens 102, the solid-immersion lens 301, and the quarter-wave plate 2401 implemented therein or thereon, a second substrate having two prisms 2701 and 2702 implemented therein, a third substrate having the collimator lens 2505 and the convergence lens 2507 implemented therein, and a PCB board having the LD 2504 and the PD 2506 implemented thereon. The substrate 101, the second substrate, the third substrate, and the PCB board are stacked one over another to form the optical-pick-up assembly. The prism 2701 has a dielectric-multi-layer film coated on a slanted surface thereof, and the prism 2702 has a slanted surface which reflects all the light.
Operations In this section, operations of the optical-pick-up assembly described above will be described.

In FIG. 30, a laser beam emitted from the LD 2504 is collimated by the collimator lens 2505 before entering the prism 2701. At this moment, the laser light has a linear polarization of P polarization. The light beam passes through the prism 2701 and the quarter-wave plate 2401. As this happens, a phase difference of $\pi/2$ is generated between an ordinary ray and an extraordinary ray, thereby providing the light beam with a circular polarization.

The quarter-wave plate 2401 has an optical axis of the crystal thereof arranged at an angle of 45° relative to the orientation of incident-light polarization. The light beam having a circular polarization then converges through the objective lens 102, and is focused at the flat-end surface of the solid-immersion lens 301. When data is read, the light beam is reflected by a surface of an optical recording medium, and is collimated by the objective lens 102 to pass through the quarter-wave plate 2401, where a state of polarization is changed to S polarization. Then, the light beam is reflected by the slanted surface of the prism 2701 since this light beam has S polarization, and travels toward the prism 2702. Reflected on the slanted surface of the prism 2702, the light beam enters the convergence lens 2507, and converges on the PD 2506.

Figure 31:
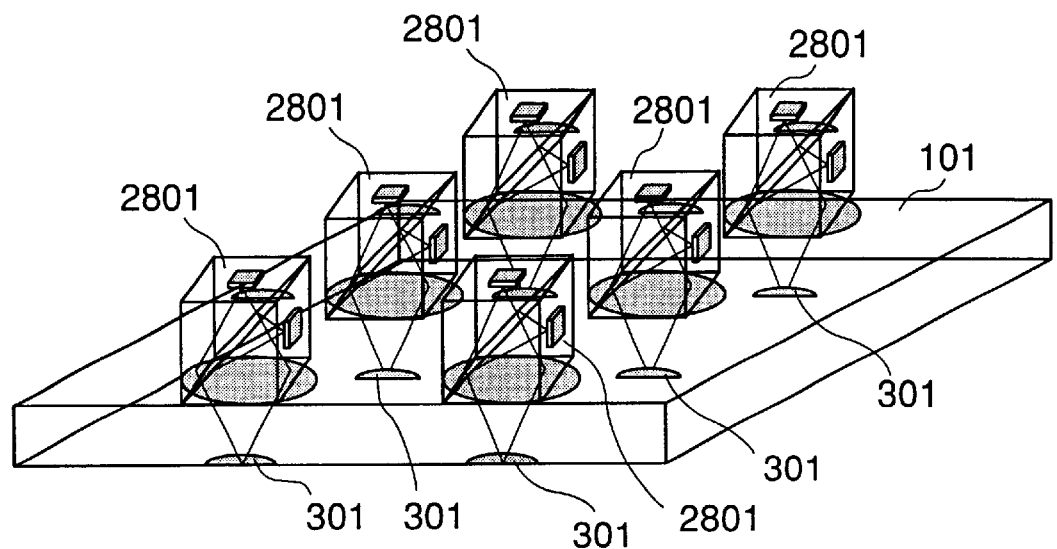
FIG. 31 is an illustrative drawing showing a configuration of an optical-pick-up assembly according to a thirteenth embodiment of the present invention.

Thirteenth Embodiment
Configuration
FIG. 31 is an illustrative drawing showing a configuration of an optical-pick-up assembly according to a thirteenth embodiment of the present invention. The optical-pick-up assembly of FIG. 31 has the optical-pick-up assemblies of FIG. 29 (denoted by a reference number 2801) arranged in an array. In an example of FIG. 29, the array is formed in a 2×3 matrix.

Data input/output operations can be separately performed with respect to different optical-pick-up assemblies 2801. Namely, circuits for driving the LD 2504 and the PD 2506 are provided for each of the optical-pick-up assemblies 2801. In FIG. 31, intervals between the optical-pick-up assemblies 2801 are identical in the column direction and in the row direction.

Figure 32:
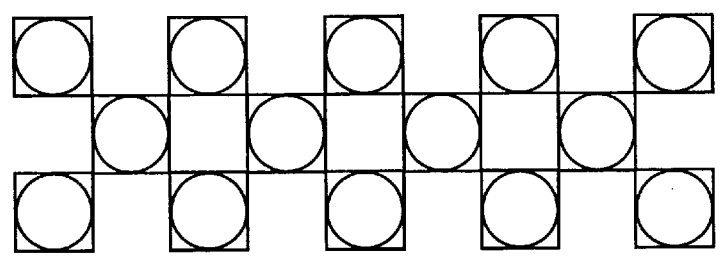
FIG. 32 is an illustrative drawing showing a configuration of an array.

FIG. 32 is an illustrative drawing showing another configuration of the array. The array can be arranged as shown in the figure. Here, an arrangement of the array is illustrated as a plan view.
Operation Operations of the optical-pick-up assembly of FIG. 31 are basically the same as those of the eleventh embodiment (FIG. 29). Control of the LD 2504 and the PD 2506 should be conducted in a manner that fits in with the array structure. At the time of data-write operations, light from the LD 2504 is modulated in accordance with data to be written. At the time of data-read operations, the LD 2504 is driven by a direct current, and the PD 2506 detects an optical signal reflected by a surface of an optical recording medium.

Variation of Thirteenth Embodiment
Configuration

Figure 33:
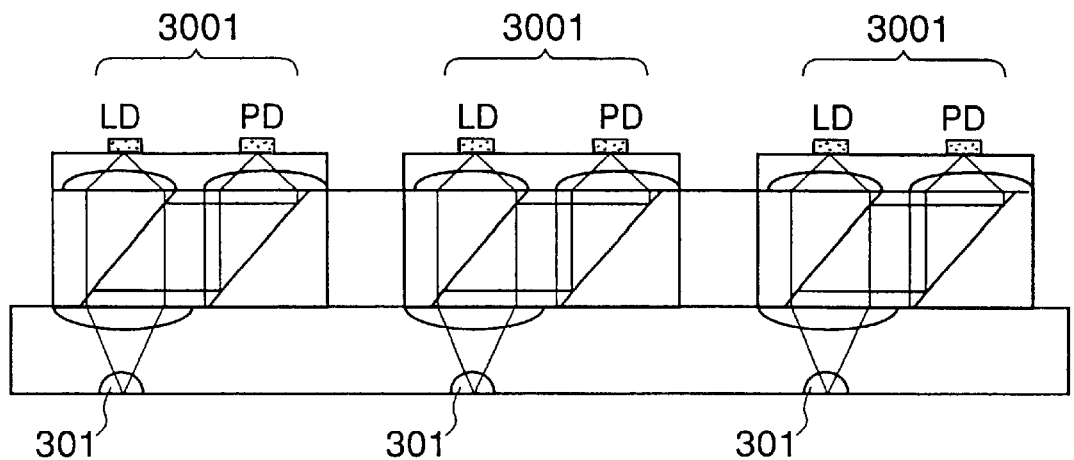
FIG. 33 is an illustrative drawing showing a configuration of an optical-pick-up assembly according to a variation of the thirteenth embodiment.

FIG. 33 is an illustrative drawing showing a configuration of an optical-pick-up assembly according to a variation of the thirteenth embodiment. The optical-pick-up assembly of FIG. 33 has the optical-pick-up assemblies of FIG. 30 (denoted by a reference number 3001) arranged in an array.

Namely, the optical-pick-up assembly of FIG. 33 includes a substrate having an array of the objective lenses 102, the solid-immersion lenses 301, and the quarter-wave plates 2401, a substrate having an array of the prisms 2701 and the prisms 2702, a substrate having an array of the convergence lenses 2507 and the collimator lenses 2505, and a substrate having an array of the LDs 2504 and the PDs 2506 with all the substrates overlaid one over another.

Operations

Operations of the optical-pick-up assembly of FIG. 33 are carried out in a similar manner to those of the thirteenth embodiment, such that data-input/output operations are independent between different optical-pick-up assemblies. Fundamentals of how this optical-pick-up assembly operates are the same as those of the twelfth embodiment (FIG. 30), and a description thereof will be omitted.

Fourteenth Embodiment

In a fourteenth embodiment, a layer of photosensitive resin is formed on a flat surface of a substrate made of an optical material, and is exposed to photolithography light diffused by use of a light diffusing method so as to generate small recesses each having a concave surface. Dry etching (isotropic etching and/or anisotropic etching) is then applied to the photosensitive resin and to the optical material so as to form small recesses equivalent to the above-mentioned small recesses. These new small recesses are filled by material having a different refractive index, creating a desired optical device. In the following, details of this process will be described.

Step 1

Figure 34:
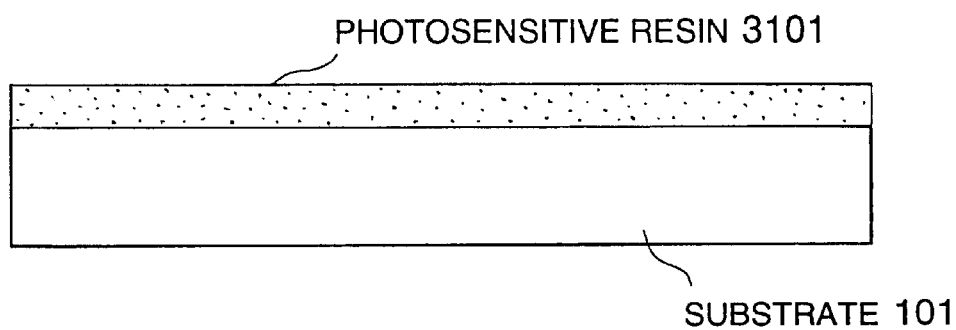
FIG. 34 is an illustrative drawing for explaining a step 1 of a process which creates an optical-pick-up device according to a fourteenth embodiment of the present invention.

FIG. 34 is an illustrative drawing for explaining a step 1 of a process which creates an optical-pick-up device according to the fourteenth embodiment of the present invention. At the step 1 shown in FIG. 34, a photosensitive resin 3101 is coated on one side of the substrate 101 by a spinner or the like so as to have a thickness defined based on a selectivity as will be described later.

As for materials used in this step, the substrate for creating lenses may be formed from a material of an appropriate choice made in accordance with use of the optical-pick-up device. For example, the substrate may be made of BK7 (a refractive index of which is 1.5115 at a wavelength of 768.2 nm).

On the substrate 101 made of such a material, the photosensitive resin 3101 is applied to form a layer having a predetermined thickness. The thickness is determined by taking into account a desired height of the resulting lenses and a ratio (selectivity) of an etching speed of the substrate to an etching speed of the photosensitive resin 3101. If both etching speeds are identical (i.e., the selectivity is 1), for example, the thickness of the photosensitive resin 3101 is set to the same height as that of the resulting lenses. If the etching speed of the substrate is twice as fast as that of the photosensitive resin 3101 (i.e., the selectivity is 2), for example, the thickness of the photosensitive resin 3101 is half the height of the resulting lenses.

Photoresist conventionally used in semiconductor manufacturing processes may be used as the photosensitive resin 3101 applied to the substrate 101. Alternately, a photosensitive dry film may be used. In detail, materials such as OFPR-800 (positive-type resist) or OMR-85 (negative-type resist), both of which are available from Tokyo Ohka Corporation, may be used. Depending on whether a positive-type resist or a negative-type resist is used, a shape of a photomask used in a process (photolithography process) is changed in order to create an appropriate resist pattern. The basic procedure, however, remains the same. In this embodiment, use of a positive-type resist is taken as an example.

Step 2

Figure 35:
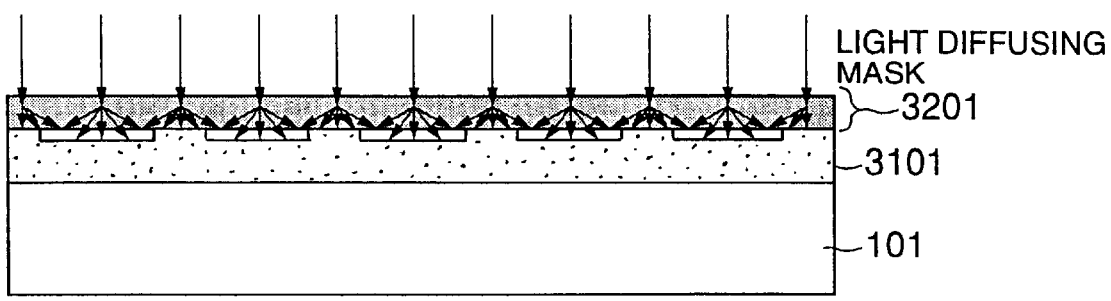
FIG. 35 is an illustrative drawing for explaining a step 2 of the process which creates an optical-pick-up device according to the fourteenth embodiment of the present invention.

FIG. 35 is an illustrative drawing for explaining a step 2 of the process which creates an optical-pick-up device according to the fourteenth embodiment of the present invention.

After the above-described step 1, the resist formed on the substrate 101 is illuminated with light having passed through a light diffusing mask 3201, which has an array of lens patterns formed therein each having a diameter smaller or equal to a desired lens diameter. Because of the diffusing nature of the light diffusing mask 3201, the light is scattered inside the light diffusing mask 3201 before illuminating the resist.

Step 3

Figure 36:
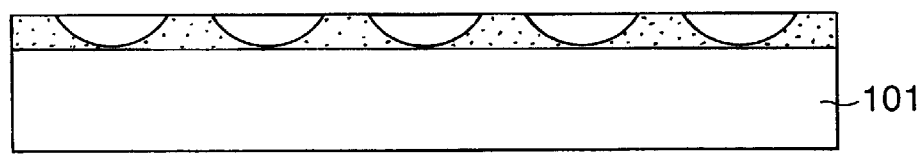
FIG. 36 is an illustrative drawing for explaining a step 3 of the process which creates an optical-pick-up device according to the fourteenth embodiment of the present invention.

FIG. 36 is an illustrative drawing for explaining a step 3 of the process which creates an optical-pick-up device according to the fourteenth embodiment of the present invention.

After the above-described step 2, a development process is performed, leaving a portion of resist having an array of recesses on the substrate 101 as shown in FIG. 36. Heat and/or pressure as deemed appropriate are applied to the remaining resist, so that an inner surface of each recess is shaped into a desired concave shape under the influence of a gravitational force and a surface tension. An appropriate temperature varies depending on a desired lens shape, but may be chosen from a range between 130° C. and 400° C. Pressure may range from one atmospheric pressure to ten atmospheric pressure.

Step 4

Figure 37:
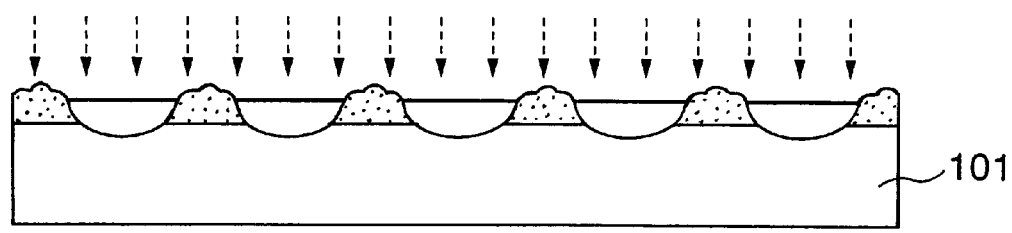
FIGS. 37 and 38 are illustrative drawings for explaining a step 4 of the process which creates an optical-pick-up device according to the fourteenth embodiment of the present invention.
Figure 38:
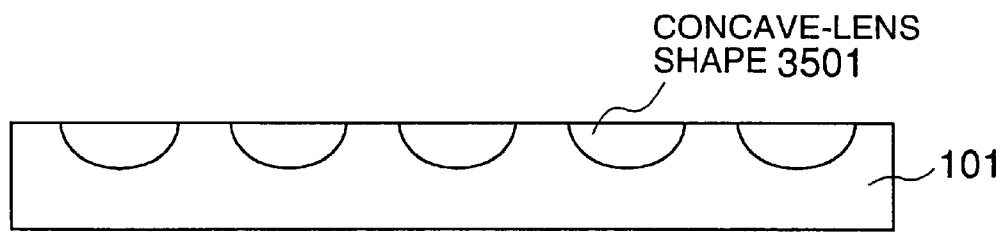

FIG. 37 and FIG. 38 are illustrative drawings for explaining a step 4 of the process which creates an optical-pick-up device according to the fourteenth embodiment of the present invention.

The resist having the concave-shape recesses therein is used as a mask when the glass of the substrate 101 is etched in a vertical direction (by use of isotropic etching). This is performed by employing dry etching which is conventionally used in a semiconductor manufacturing process. In detail, reactive-ion-dry etching may be used. Alternately, electron-cyclotron-resonance etching may be used, wherein gas is introduced and ionized to create ions, which are electrically accelerated toward the substrate 101 to crash into a surface thereof from a vertical direction.

The gas used for dry etching is selected in accordance with the material of the substrate. When the substrate material is glass, the gas may be $CF_4$, $CHF_3$, or the like. Further, gas such as $N_2$, $O_2$, Ar, etc., may be mixed with the above-mentioned gas for the purpose of adjusting etching speed and a selectivity. The etching process will continue until the resist disappears so as to create a lens shape appropriate in terms of a diameter and a depth, or is performed to etch a predetermined amount of resist. When resist remains, a conventional process is employed to remove only the resist. In this manner, concave shapes 3501 are created in the substrate 101.

Step 5

Figure 39:
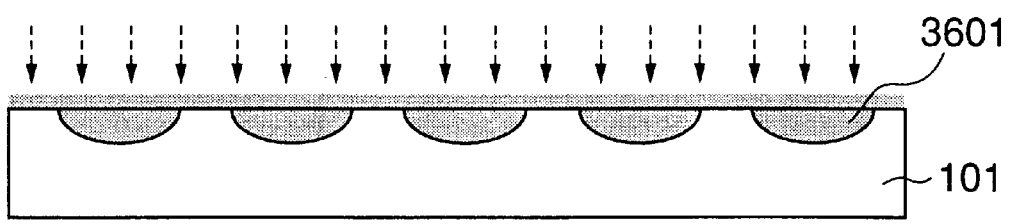
FIGS. 39 and 40 are illustrative drawings for explaining a step 5 of the process which creates an optical-pick-up device according to the fourteenth embodiment of the present invention.
Figure 40:
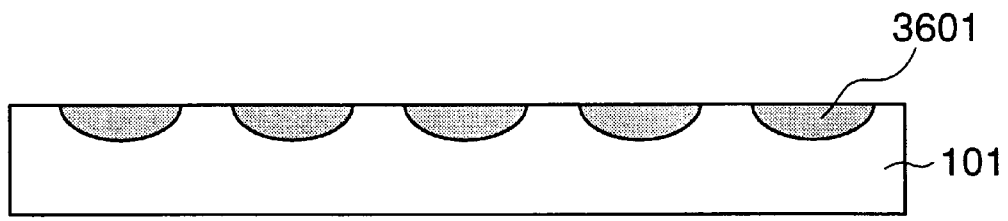

FIG. 39 and FIG. 40 are illustrative drawings for explaining a step 5 of the process which creates an optical-pick-up device according to the fourteenth embodiment of the present invention. In this step, material having a refractive index higher than that of the substrate 101 is filled in the concave shapes 3501 formed by the step 4. To this end, this embodiment employs a sputter method using a material having a desired refractive index to form a sputter layer 3601, which is provided not only on the flat surface of the substrate 101 but also in the concave shapes 3501. Etching-back and smoothing of the surface are then performed, thereby selectively leaving a portion of the sputter layer 3601 only inside the concave shapes 3501. This creates lenses having a flat upper surface. An array of lenses are created in the substrate 101, which is then cut into pieces to obtain a single lens composite. The material which is filled in the concave shapes may be LaF2 (a refractive index of which is 1.7335 at the wavelength of 768.2 nm), or may be SFS1 (a refractive index of which is 1.8927 at the wavelength of 768.2 nm). Instead of using the sputter method, a process of coating a photo-coagulation-resin material may be used.

Detail

In what follows, details of choice of materials and processes will be described with regard to the above-described steps 1 through 5.

Synthetic quartz is used for the substrate 101, and OFPR-800 of Tokyo Ohka Corporation is used as the positive resist. The light diffusing mask is made of opal glass. The resist is coated on the synthetic quartz by spin coating so as to have a layer thickness of 5 $\mu$m. After pre-baking, the resist is subjected to exposure via the light diffusing mask to undergo a development process. Following this process, the resist undergoes a post-baking process at 200° C., and, then, is etched by an ECR etching process. Gas such as Ar, $O_2$, or $CF_4$ is used in this process. Following the etching, the remaining resist is removed before a layer of SFS1 is developed by a sputter. Finally, the surface is smoothed by surface grinding, thereby having a desired layer thickness.

In the following, the steps involved in the fourteenth embodiment will be described again in a concise manner to facilitate better understanding. The photosensitive resin 3101 is coated on the substrate 101 by a spinner or the like. Then, a pattern of the mask is illuminated with light emitted from a light source of a conventional exposure device such as a semiconductor manufacturing device. The light passes through or is absorbed or reflected by the photo mask, so that scattered light is cast on the photosensitive resin 3101. If the scattered light meets a condition of complete diffusion, an intensity of light observed at an angle at a position of light diffusion is proportional to the n-th power of a cosine of the angle. Because of this, when the surface of the photosensitive resin 3101 on the substrate 101 is kept at some distance from the mask, an intensity distribution of light will end up having a shape determined in proportion to the n-th power of a cosine of the angle. In this manner, the photosensitive resin 3101 is exposed to the light having this intensity distribution. A subsequent development process creates a concave surface approximating a shape of the intensity distribution in the photosensitive resin 3101 with respect to each lens shape. A dry etching process is then applied, thereby forming a concave surface in the substrate. The remnant of the photosensitive resin 3101 is then removed, and a material having a higher refractive index than the substrate 101 is filled in to produce a flat-surface lens.

Fifteenth Embodiment

Figure 41:
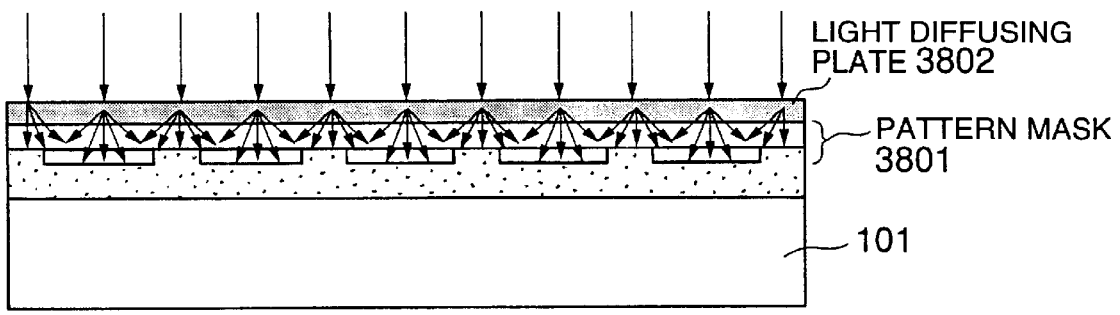
FIG. 41 is an illustrative drawing for explaining a first embodiment of creating scattered light applicable in the fourteenth embodiment.

A fifteenth embodiment is concerned with a method of creating scattered light used in the fourteenth embodiment. FIG. 41 is an illustrative drawing for explaining a first embodiment of creating scattered light applicable in the fourteenth embodiment.

In this example, a light defusing plate 3802 is placed on a pattern mask 3801 to create scattered light. The pattern mask 3801 used in this configuration is of a conventional structure made of a glass plate with a Cr pattern formed thereon.

As shown in FIG. 41, the light defusing plate 3802 is situated on the pattern mask 3801 at the time of exposure. After the exposure, the etching process and the filling of the high-refractive-index material will be performed as described in connection with the fourteenth embodiment. This configuration can create a recess having a rectangular cross-sectional shape in addition to the recesses having a curved cross-sectional shape. When creating such a recess having a rectangular cross-sectional shape, light-diffusing glass is removed from the portion where such a recess is created while being placed on the portions where the recesses having a curved surface are formed.

Sixteenth Embodiment

Figure 42:
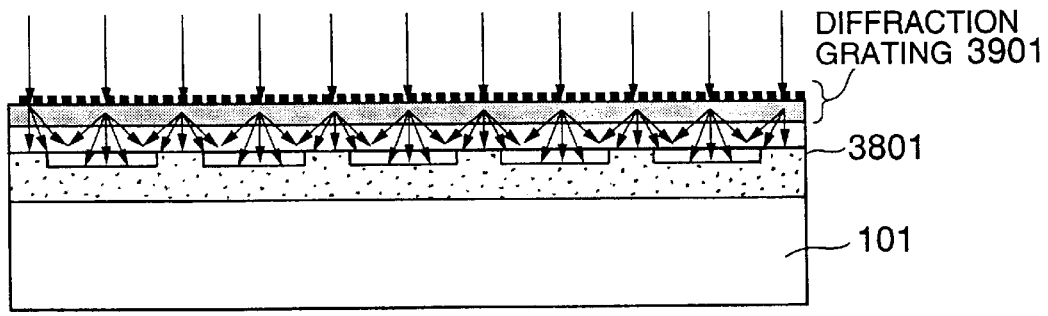
FIG. 42 is an illustrative drawing for explaining a second embodiment of creating scattered light applicable in the fourteenth embodiment.

FIG. 42 is an illustrative drawing for explaining a second embodiment of creating scattered light applicable in the fourteenth embodiment.

In this example, a diffraction grating 3901 is placed on the pattern mask 3801 to create scattered light. The diffraction grating 3901 is structured such that it creates a light-intensity distribution which satisfies a desired diffusion condition. A diffraction grating pattern which can produce a desired shape such as a non-spherical shape can be designed by taking into account a first order of diffraction as well as higher orders of diffraction of the grating.

Alternately, diffraction of light caused by minuscule apertures may be employed. An intensity of light when diffraction is created by circular apertures is known as an Airy disc, and a Bessel function can represent such a light intensity. In this case, zero order diffraction light can be used for forming a concave surface in the photosensitive resin 3101.

Seventeenth Embodiment

A seventeenth embodiment is directed to a process of forming objective lenses and solid-immersion lenses in the substrate based on the method of the fourteenth embodiment. One of these two types of lenses is created first, and, then, the other one is created on the other side of the substrate. In the following, steps involved in this embodiment will be described.

Step 1

Figure 43:
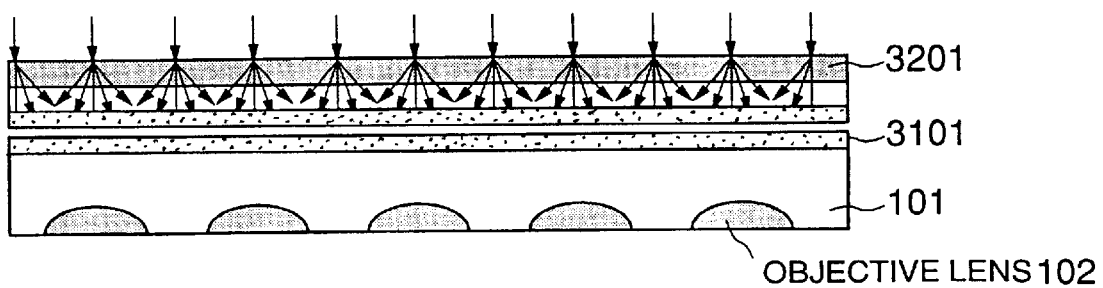
FIG. 43 is an illustrative drawing for explaining a step 1 of a process of manufacturing an optical-pick-up device according to a seventeenth embodiment.

FIG. 43 is an illustrative drawing for explaining a step 1 of the process of manufacturing an optical-pick-up device according to the seventeenth embodiment. FIG. 43 shows a stage in which the objective lenses 102 have already been created on one side of the substrate, and the photosensitive resin 3101 coated on the other side is being subjected to exposure by use of the light diffusing mask 3201.

The thickness of the photosensitive resin 3101 is determined by taking into account a desired height of the resulting lenses and a ratio (selectivity) of an etching speed of the substrate to an etching speed of the photosensitive resin when an etching process is applied to the photosensitive resin 3101. If both etching speeds are identical (i.e., the selectivity is 1), for example, the thickness of the photosensitive resin is set to the same height as that of the resulting lenses. If the etching speed of the substrate is twice as fast as that of the photosensitive resin (i.e., the selectivity is 2), for example, the thickness of the photosensitive resin is half the height of the resulting lenses.

The seventeenth embodiment takes as an example a case in which a positive-type resist is used as a photosensitive material as in the previous embodiments. In order to insure an accurate alignment of newly created lenses with other lenses which have been already put in place on the other surface, alignment marks are provided on one side of the substrate where the objective lenses 102 are formed, and the mask is also provided with other alignment marks. These alignment marks are used for accurate positioning at the time of exposure.

Step 2

Figure 44:
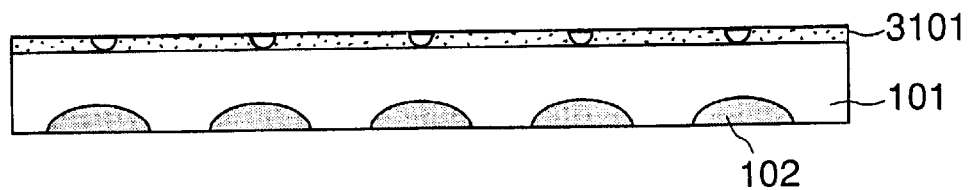
FIG. 44 is an illustrative drawing for explaining a step 2 of the process of manufacturing an optical-pick-up device according to the seventeenth embodiment.

FIG. 44 is an illustrative drawing for explaining a step 2 of the process of manufacturing the optical-pick-up device according to the seventeenth embodiment.

At the step 2, a development process is performed in the same manner as in the fourteenth embodiment, following the exposure process performed at the step 1. This development process results in the resin being left on the substrate 101 with recesses having a concave surface. Heat and/or pressure are applied to the resist as they are deemed necessary, so that the recesses are shaped into a desired concave form by drawing on the influence of a gravitational force and a surface tension. The applied heat and pressure depend on the shape of the lens. Usually, a temperature ranging between 200° C. and 400° C. and a pressure between 1 atmospheric pressure and 10 atmospheric pressure are applied.

Step 3

Figure 45:
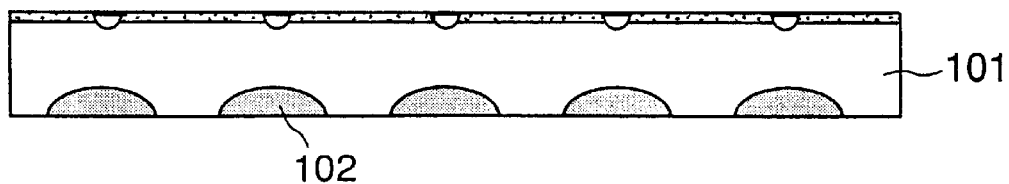
FIGS. 45 and 46 are illustrative drawings for explaining a step 3 of the process of manufacturing an optical-pick-up device according to the seventeenth embodiment.
Figure 46:
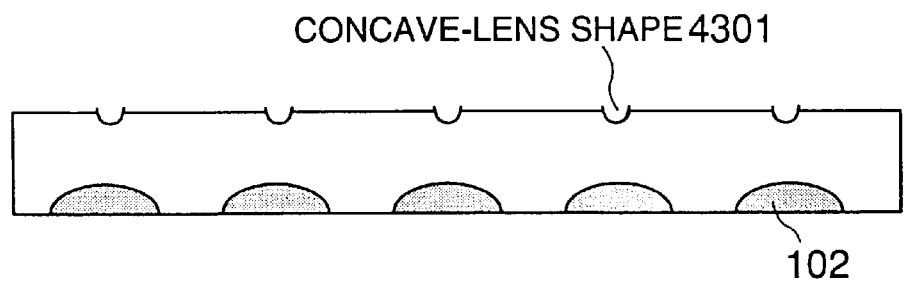

FIG. 45 and FIG. 46 are illustrative drawings for explaining a step 3 of the process of manufacturing the optical-pick-up device according to the seventeenth embodiment.

By using the resin having the lens-shape recesses formed at the step 2 as a mask, the substrate glass is etched (anisotropic etching) in a vertical direction. A dry etching process conventionally used in a semiconductor manufacturing process may be employed for this purpose. In detail, reactive-ion etching or electro-cyclotron-reverberation etching may be used.

Gases used for dry etching may be chosen in accordance with the material of the substrate. If the substrate is made of glass, $CF_4$ or $CHF_3$ may be used. Further, gasses such as $N_2$, $O_2$, or Ar may be added to the above-identified gasses in order to adjust etching speed and selectivity. The etching process will continue until the resist disappears so as to create a lens shape appropriate in term of a diameter and a depth, or is performed to etch a predetermined amount of resist. When resist remains, a conventional process is employed to remove only the resist. In this manner, concave shapes 4301 are created in the substrate 101.

Step 4

Figure 47:
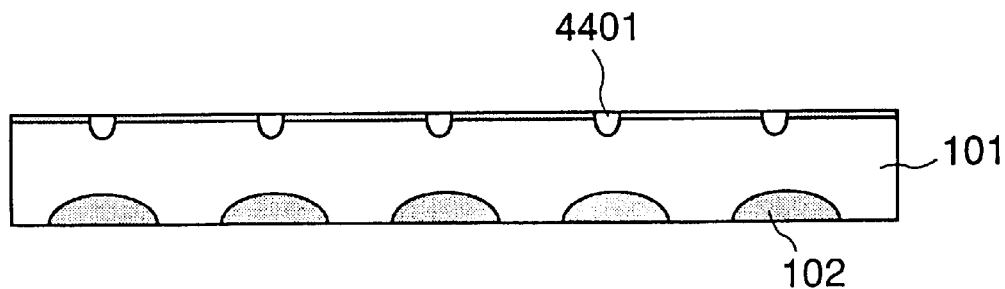
FIG. 47 is an illustrative drawing for explaining a step 4 of the process which creates an optical-pick-up device according to the seventeenth embodiment of the present invention.

FIG. 47 is an illustrative drawing for explaining a step 4 of the process which creates an optical-pick-up device according to the seventeenth embodiment of the present invention.

In this step, material having a refractive index higher than that of the substrate 101 is filled in the concave shapes 4301 formed by the step 3. To this end, this embodiment employs a sputter method using a material having a desired refractive index to form a sputter layer 4401, which is provided not only on the flat surface of the substrate 101 but also in the concave shapes 4301. Etching-back and smoothing of the surface are then performed, thereby selectively leaving a portion of the sputter layer 4401 only inside the concave shapes 4301. This creates lenses having a flat upper surface. An array of lenses are created in the substrate 101, which is then cut into pieces to obtain a single lens composite. In place of the sputter method, a method of coating a photo-coagulation-resin material may be used.

When there is a need to lift the head created as in the above in the air, a concave pattern is etched in the bottom surface of the head by taking into account aerodynamic characteristics. A light diffusing glass is used where microlenses are formed, while transparent glass is used where grooves are formed.

Eighteenth Embodiment

In an eighteenth embodiment, the objective lens 102 and the solid-immersion lens 301 are separately created in two different substrates. Here, the objective lens 102 serves to concentrate a collimated light beam. The two substrates are connected together such that the objective lens 102 and the solid-immersion lens 301 have the aligned optical axis.

An example of how to connect these two substrates will be described with reference to FIG. 19. The substrate 101 provided with the objective lens 102 and the substrate 1601 with the solid-immersion lens 301 are respectively created in accordance with the manufacturing process of the fourteenth through seventeenth embodiments. These two substrates are formed from an identical material. The substrate 101 with the objective lens 102 has a protrusion (on the left-hand side in the figure) and a recess (on the right-hand side) formed on the bottom surface thereof. Further, the substrate 1601 provided with the solid-immersion lens 301 has a recess (on the right) and a protrusion (on the left) at positions corresponding to those of the substrate 101. The two substrates are connected together such that each protrusion is fit into the respective recess, thereby creating a head as shown in FIG. 19.

Shapes of the protrusion and the recess are not limited to a particular configuration, but can have any configuration as long as those shapes provide easy fitting. As is apparent, also, the number of the protrusions and the recesses are not limited to two, but can be any number. In order to achieve a secure fix between the two substrates, glue or an electrochemical means may be employed. Further, the protrusions and the recesses should avoid positions where light travels between the objective lens 102 and the solid-immersion lens 301. When glue is used, it is preferable to use an ultraviolet-coagulation resin having substantially the same refractive index as the substrate 101.

Figure 23:
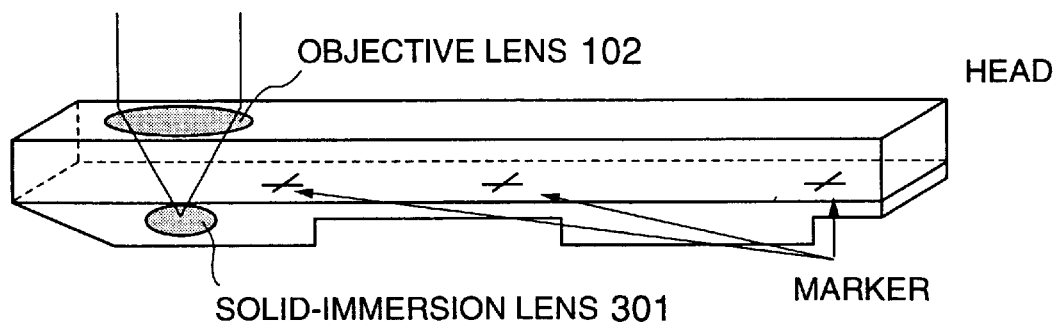
FIG. 23 is an illustrative drawing showing an example where three markers are provided for positional alignment.

In the following, another embodiment of connecting substrates will be described with reference to FIG. 23. The substrate 101 provided with the objective lens 102 and the substrate 1601 with the solid-immersion lens 301 are respectively created in accordance with the manufacturing process of the fourteenth through seventeenth embodiments, and are connected together by using markers provided at respective predetermined positions. FIG. 23 shows an example where three markers are provided for this purpose. However, the number of markers is not limited to three, but can be any number which is deemed to be appropriate.

Moreover, the connection may be effected in the same manner as in the example of FIGS. 24A and 24B. As shown in FIG. 24A, alignment units are provided at positions encircling the optical axis of the objective lens 102, so that two units forming a pair oppose each other across the optical axis. On the substrate provided with the solid-immersion lens 301, as shown in FIG. 24B, other alignment units are positioned on a perimeter of a circle centered at the optical axis of the solid-immersion lens 301 so as to correspond to the alignment units shown in FIG. 24A. The two substrates are then connected with each other such that the alignment units on one substrate match the alignment units on the other substrate, respectively.

The alignment units may have three-dimensional structures such as protrusions and recesses. In order to make protrusions or recesses, a resist formation process and an etching process may be employed.

Figure 25:
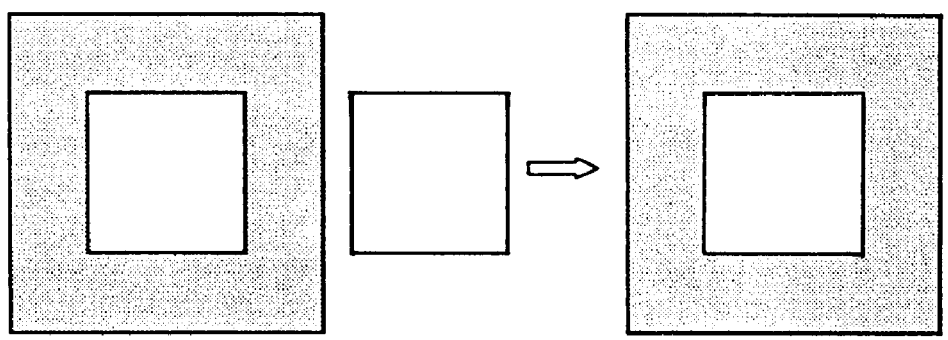
FIG. 25 is an illustrative drawing showing examples of two-dimensional markers.
Figure 25:
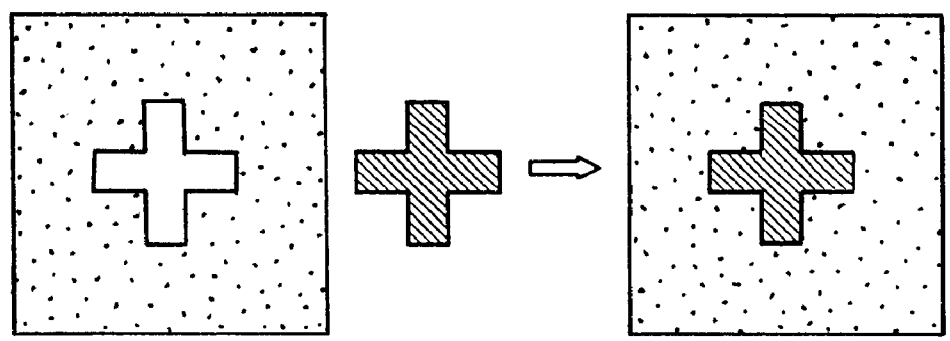

Alternately, the alignment units may include two-dimensional markers as shown in FIG. 25. These markers are conventionally used in semiconductor manufacturing processes, wherein markers having sufficient precision for an alignment purpose are formed on two substrates to be aligned, and two markers forming a respective pair are matched to achieve exact alignment. These alignment markers may be created by introducing a method of the fourteenth embodiment through the seventeenth embodiment to a conventional semiconductor manufacturing process.

After the two substrates are positioned relative to each other such that two optical axes are aligned, the two substrates need to be fixedly connected. For this purpose, glue may be used. Alternately, electrochemical schemes such as anodic bonding or high-temperature bonding may be employed.

Further, the present invention is not limited to these embodiments, but various variations and modifications may be made without departing from the scope of the present invention.

What is claimed is:

1. An optical-pick-up device which focuses a coherent light beam to form a spot on an optical recording medium, and performs recording/reproducing of information with respect to said optical recording medium, said optical-pick-up device comprising:
    a substrate;
    an objective lens formed on one side of said substrate and configured to focus said coherent light beam at a surface of no contact situated on another side of said substrate; and
    a layer having a refractive index higher than that of said substrate and provided on said another side of said substrate to form said exposed surface.

2. The optical-pick-up device as claimed in claim 1, wherein a total thickness of said substrate and said layer combined is equal to a focal distance of said objective lens.

3. An optical-pick-up device which focuses a coherent light beam to form a spot on an optical recording medium, and performs recording/reproducing of information with respect to said optical recording medium, said optical-pick-up device comprising:
    a substrate;
    an objective lens formed on one side of said substrate and configured to focus said coherent light beam at a surface of no contact situated on another side of said substrate; and
    a solid-immersion lens having a refractive index higher than that of said substrate and provided on said another side of said substrate, said solid-immersion lens being aligned to said objective lens in terms of an optical axis.

4. A method of creating an optical-pick-up device which focuses a coherent light beam to form a spot on an optical recording medium, and performs recording/reproducing of information with respect to said optical recording medium, said method comprising the steps of:
    a) forming an objective lens on one side of a substrate, said objective lens focusing said coherent light beam;
    b) forming a recess having a curved surface in a surface of another side of said substrate; and
    c) filling in said recess with a material having a refractive index higher than that of said substrate so as to form a solid-immersion lens.

5. The method as claimed in claim 4, wherein said step a) comprises a step of creating a convex surface on said one side of said substrate so as to form said objective lens.

6. The method as claimed in claim 4, wherein said step a) comprises the steps of:
    a1) forming a recess having a curved surface in a surface of said one side of said substrate; and
    a2) filling in said recess with a material having a refractive index higher than that of said substrate so as to form said objective lens.

7. An optical-pick-up device which focuses a coherent light beam to form a spot on an optical recording medium, and performs recording/reproducing of information with respect to said optical recording medium, said optical-pick-up device comprising:
    an objective lens formed on a first substrate and configured to focus said coherent light beam; and
    a solid-immersion lens formed in a second substrate and having a refractive index higher than that of said first substrate,
    wherein said first substrate and said second substrate are connected together to form a single composite.

8. The optical-pick-up device as claimed in claim 7, wherein said first substrate and said second substrate have different refractive indexes.

9. A method of creating an optical-pick-up device which focuses a coherent light beam to form a spot on an optical recording medium, and performs recording/reproducing of information with respect to said optical recording medium, said method comprising the steps of:
    a) forming a first substrate with an objective lens for focusing said coherent light beam;
    b) forming a second substrate with a solid-immersion lens; and
    c) connecting said first substrate and said second substrate together such that said objective lens and said solid-immersion lens are aligned in terms of an optical axis thereof.

10. The method as claimed in claim 9, wherein said step a) comprises a step of creating a convex surface on said first substrate so as to form said objective lens.

11. The method as claimed in claim 10, wherein said step b) comprises a step of creating a convex surface on said second substrate so as to form said solid-immersion lens.

12. The method as claimed in claim 10, wherein said step b) comprises the steps of:
    b1) creating a recess having a concave surface in said second substrate; and
    b2) filling in said recess with a material having a refractive index higher than that of said second substrate so as to form said solid-immersion lens.

13. The method as claimed in claim 9, wherein said step a) comprises the steps of:

a1) creating a recess having a concave surface in said first substrate; and a2) filling in said recess with a material having a refractive index higher than that of said first substrate so as to form said objective lens.

14. The method as claimed in claim 13, wherein said step b) comprises the steps of:

b1) creating a recess having a concave surface in said second substrate; and b2) filling in said recess with a material having a refractive index higher than that of said second substrate so as to form said solid-immersion lens.

15. An optical-pick-up device which focuses at least one coherent light beam to form at least one spot on an optical recording medium, and performs recording/reproducing of information with respect to said optical recording medium, said optical-pick-up device comprising:

a plurality of objective lenses formed on a first substrate and configured to focus said at least one coherent light beam; and a plurality of solid-immersion lenses formed in a second substrate and having a refractive index higher than that of said first substrate, wherein said first substrate and said second substrate are connected together to form a single composite, and said plurality of objective lenses and said plurality of solid-immersion lenses are arranged in an array form, respectively.

16. An optical-pick-up device which focuses a coherent light beam to form a spot on an optical recording medium, and performs recording/reproducing of information with respect to said optical recording medium, said optical-pick-up device comprising:

an objective lens configured to focus said coherent light beam;

a solid-immersion lens having a first refractive index and having an optical axis aligned to that of said objective lens;

a beam deviating unit provided over said objective lens and configured to change a direction in which said coherent light beam travels;

a polarization unit provided between said beam deviating unit and said objective lens and configured to change a polarization of said coherent light beam; and a substrate formed with said objective lens, said solid-immersion lens, said beam deviating unit, and said polarization unit, and having a second refractive index lower than said first refractive index.

17. An optical-pick-up assembly which focuses a coherent light beam to form a spot on an optical recording medium, and performs recording/reproducing of information with respect to said optical recording medium, said optical-pick-up assembly comprising:

an objective lens configured to focus said coherent light beam;

a solid-immersion lens having a first refractive index and having an optical axis aligned to that of said objective lens;

a beam deviating unit provided over said objective lens and configured to change a direction in which said coherent light beam travels;

a polarization unit provided between said beam deviating unit and said objective lens and configured to change a polarization of said coherent light beam;

a light emitting unit configured to emit said coherent light beam;

a light detecting unit configured to detect a reflected light beam returning from said optical recording medium; and a substrate formed with said objective lens, said solid-immersion lens, said beam deviating unit, said polarization unit, said light emitting unit, and said light detecting unit, and having a second refractive index lower than said first refractive index.

18. The optical-pick-up assembly as claimed in claim 17, comprising a plurality of sets each of which includes an objective lens identical to said objective lens, a solid-immersion lens identical to said solid-immersion lens, a beam deviating unit identical to said beam deviating unit, a polarization unit identical to said polarization unit, a light emitting unit identical to said light emitting unit, and a light detecting unit identical to said light detecting unit, said sets together forming an array.

19. An optical-pick-up assembly which focuses a coherent light beam to form a spot on an optical recording medium, and performs recording/reproducing of information with respect to said optical recording medium, said optical-pick-up assembly comprising:

an objective lens configured to focus said coherent light beam;

a solid-immersion lens having a first refractive index and having an optical axis aligned to that of said objective lens;

a beam deviating unit provided over said objective lens and configured to change a direction in which said coherent light beam travels;

a polarization unit provided between said beam deviating unit and said objective lens and configured to change a polarization of said coherent light beam;

a light emitting unit configured to emit said coherent light beam;

a light detecting unit configured to detect a reflected light beam returning from said optical recording medium; and a plurality of substrates which are combined together and formed with said objective lens, said solid-immersion lens, said beam deviating unit, and said polarization unit, said light emitting unit, and said light detecting unit, and one of said substrates formed with said solid-immersion lens has a second refractive index lower than said first refractive index.

20. The optical-pick-up assembly as claimed in claim 19, comprising a plurality of sets each of which includes an objective lens identical to said objective lens, a solid-immersion lens identical to said solid-immersion lens, a beam deviating unit identical to said beam deviating unit, a polarization unit identical to said polarization unit, a light emitting unit identical to said light emitting unit, and a light detecting unit identical to said light detecting unit, said sets together forming an array.

21. A method of creating an optical-pick-up device based on photolithography, said method comprising the steps of:

a) applying a photosensitive resin on a substrate such that said photosensitive resin has a predetermined thickness;

b) casting light on said photosensitive resin after said light passes through a diffusing plate and a pattern mask provided over said photosensitive resin;

c) applying a development process so as to create a recess having a concave surface in said photosensitive resin, said concave surface representing an intensity distribution of said light;

d) applying dry etching so as to create a lens shape from said recess; and e) filling in the lens shape with a material having a refractive index higher than that of said substrate so as to create a first lens.

22. The method as claimed in claim 21, wherein said diffusing plate and said pattern mask comprise a single plate.

23. The method as claimed in claim 21, wherein said diffusing plate comprises glass.

24. The method as claimed in claim 21, wherein said diffusing plate comprises a diffraction grating.

25. The method as claimed in claim 21, further comprising a step of repeating said steps a) through e) to form a second lens on one side of said substrate when said first lens is created on an opposite side of said substrate, one of said first lens and said second lens being an objective lens and the other one of said first lens and said second lens being a solid-immersion lens.

26. The method as claimed in claim 21, further comprising the steps of:

repeating said steps a) through e) with respect to another substrate so as to form a second lens in said another substrate; and combining said substrate with said another substrate such that said first lens and said second lens are aligned in terms of an optical axis thereof, wherein one of said first lens and said second lens is an objective lens, and the other one of said first lens and said second lens is a solid-immersion lens.

27. An optical-pick-up device which focuses a coherent light beam to form a spot on an optical recording medium, and performs recording/reproducing of information with respect to said optical recording medium, said optical-pick-up device comprising:

a substrate;

an objective lens formed on one side of said substrate; and a solid-immersion lens having a refractive index higher than that of said substrate and provided on another side of said substrate, said solid-immersion lens being aligned to said objective lens in terms of an optical axis.

* * * * *